(12) United States Patent
Bender et al.

(10) Patent No.: US 11,945,316 B2
(45) Date of Patent: Apr. 2, 2024

(54) MICROMOBILITY TRANSIT VEHICLE BATTERY CONNECTION AND LOCK SYSTEMS AND METHODS

(71) Applicant: Lyft, Inc., San Francisco, CA (US)

(72) Inventors: Adam Christopher Bender, Mountain View, CA (US); Erica Catherine Keenan, San Francisco, CA (US); Jared Mitchell Kole, San Jose, CA (US); Andrew Michael Reimer, San Francisco, CA (US); Neil Richard Anthony Saldanha, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 765 days.

(21) Appl. No.: 16/917,102

(22) Filed: Jun. 30, 2020

(65) Prior Publication Data
US 2021/0402883 A1 Dec. 30, 2021

(51) Int. Cl.
*B60L 50/64* (2019.01)
*H01M 50/244* (2021.01)
(Continued)

(52) U.S. Cl.
CPC ........... *B60L 50/64* (2019.02); *H01M 50/244* (2021.01); *H01M 50/249* (2021.01);
(Continued)

(58) Field of Classification Search
CPC . B62M 6/80; B62M 6/90; B60L 50/64; B60L 2200/24; H01M 50/249;
(Continued)

(56) References Cited

U.S. PATENT DOCUMENTS

| 8,727,367 B2 * | 5/2014 | Talavasek | B62K 19/06 |
| | | | 280/281.1 |
| 8,979,110 B2 * | 3/2015 | Talavasek | B62J 43/28 |
| | | | 280/279 |

(Continued)

FOREIGN PATENT DOCUMENTS

| DE | 202015003701 | 6/2015 |
| EP | 0716009 | 6/1996 |

(Continued)

OTHER PUBLICATIONS

Translation of JP 2000072073 A accessed at www.espacenet.com on Aug. 1, 2023. (Year: 2000).*

(Continued)

*Primary Examiner* — James A Shriver, II
(74) *Attorney, Agent, or Firm* — Baker Botts L.L.P.

(57) ABSTRACT

Techniques are disclosed for systems and methods associated with a micromobility transit vehicle battery connection and lock. In accordance with one or more embodiments, a micromobility transit vehicle is provided. The micromobility transit vehicle may include a frame, a battery configured to be received at least partially within the frame, and a battery lock within the frame. The frame may include a downtube having a recess disposed therein. The battery may be configured to be received within the downtube and the recess to establish a continuous surface comprising one or more outer surfaces of the downtube and one or more outer surfaces of the battery. The battery lock may be positioned within the recess and configured to engage the battery to lock the battery in place.

20 Claims, 21 Drawing Sheets

(51) Int. Cl.
*H01M 50/249* (2021.01)
*H01M 50/256* (2021.01)
*H01M 50/262* (2021.01)

(52) U.S. Cl.
CPC ....... *H01M 50/256* (2021.01); *H01M 50/262* (2021.01); *B60L 2200/24* (2013.01); *H01M 2220/20* (2013.01)

(58) Field of Classification Search
CPC ............. H01M 50/262; H01M 50/244; H01M 50/256; H01M 2220/20
USPC ......................................................... 180/180
See application file for complete search history.

(56) References Cited

U.S. PATENT DOCUMENTS

| | | | | |
|---|---|---|---|---|
| 11,161,567 | B2* | 11/2021 | Eguchi | B62K 19/40 |
| 11,572,132 | B2* | 2/2023 | den Hertog | B62K 19/30 |
| 11,701,275 | B2* | 7/2023 | Woo | B60K 1/04 180/65.1 |
| 2018/0006278 | A1* | 1/2018 | Shimoda | H01M 50/202 |
| 2018/0072380 | A1* | 3/2018 | Talavasek | B62K 25/28 |
| 2018/0222549 | A1* | 8/2018 | Ragland | B62J 3/10 |
| 2018/0269439 | A1* | 9/2018 | Yoneda | B62M 6/90 |
| 2019/0229307 | A1* | 7/2019 | Mitsuyasu | H01M 50/213 |
| 2019/0291810 | A1* | 9/2019 | Slaoui | B62M 6/40 |
| 2019/0329660 | A1* | 10/2019 | Shieh | B62M 6/90 |
| 2019/0337587 | A1* | 11/2019 | den Hertog | H01M 50/20 |
| 2019/0337588 | A1* | 11/2019 | Wecker | B62K 19/40 |
| 2022/0096292 | A1* | 3/2022 | Woo | B60K 7/0007 |

FOREIGN PATENT DOCUMENTS

| | | | |
|---|---|---|---|
| JP | 2000072073 | | 3/2000 |
| JP | 2000072073 A | * | 3/2000 |
| KR | 101207885 B1 | * | 7/2012 |
| KR | 101207885 | | 12/2012 |

OTHER PUBLICATIONS

Translation of KR 101207885 B1 accessed at www.espacenet.com on Aug. 2, 2023. (Year: 2012).*
International Search Report and Written Opinion for International Application No. PCT/US2021/038540 (16 pages).

* cited by examiner

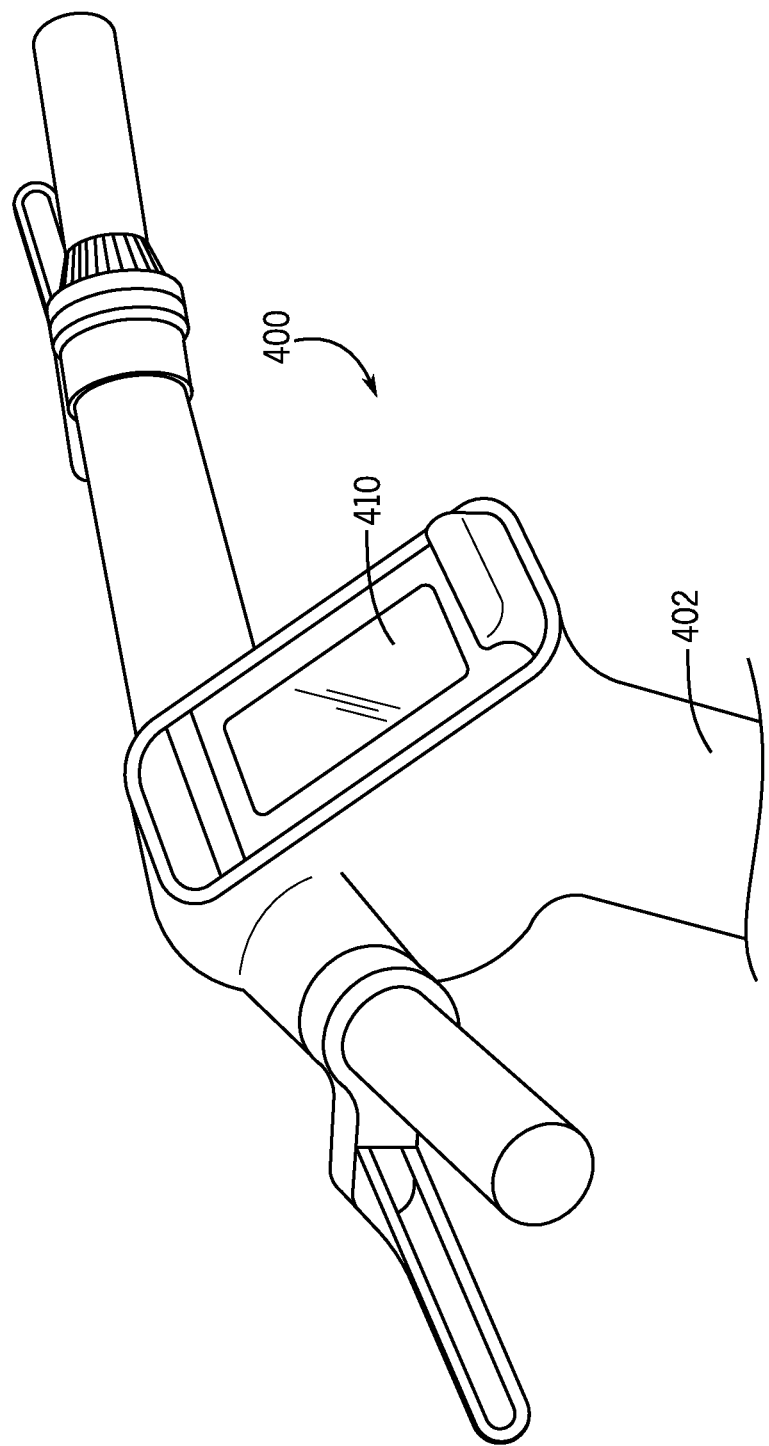

MICROMOBILITY TRANSIT VEHICLE BATTERY CONNECTION AND LOCK SYSTEMS AND METHODS

TECHNICAL FIELD

One or more embodiments of the present disclosure relate generally to micromobility transit vehicles and more particularly, for example, to systems and methods for connecting and locking one or more batteries to a micromobility transit vehicle.

BACKGROUND

Legacy designs for micromobility vehicles for hire (e.g., shared scooters, sit-scooters, bicycles, etc.) can include an exposed battery secured to a tube (e.g., a downtube) of the vehicle's frame. In such designs, the exposed battery is secured to the tube using exposed latches or other exposed securement means. The exposed battery and latches are often subject to theft, vandalism, and other damage. For instance, the exposed battery can present many pry points permitting, either collectively or individually, a large amount of leverage to be applied by vandals. The exposed latches may also provide insufficient retention forces, allowing the exposed battery to be pried loose or even knocked loose during ride conditions.

Therefore, there is a need in the art for systems and methods for a battery and battery connection that addresses the deficiencies noted above, other deficiencies known in the industry, or at least offers an alternative to current techniques. For example, improvements are needed to secure a battery in a manner that reduces or prevents theft, vandalism, and damage to the battery.

SUMMARY

Techniques are disclosed for systems and methods associated with a micromobility transit vehicle battery connection and lock. In accordance with one or more embodiments, a micromobility transit vehicle is provided. The micromobility transit vehicle may include a frame, a battery receivable at least partially within the frame, and a battery lock within the frame. The frame may include a downtube having a recess disposed therein. The battery may be configured to be received within the downtube and the recess to establish a continuous surface comprising one or more outer surfaces of the downtube and one or more outer surfaces of the battery. The battery lock may be positioned within the recess and configured to engage the battery to lock the battery in place.

In accordance with one or more embodiments, a micromobility transit vehicle is provided. The micromobility transit vehicle may include a frame and a battery lock within the frame. The frame may include a downtube having a recess disposed therein. The battery lock may be positioned within the recess and configured to engage a battery to lock the battery within the downtube and the recess.

In accordance with one or more embodiments, a battery for a micromobility transit vehicle including a downtube having a recess disposed therein and a battery lock within the recess is provided. The battery may include an enclosure, an outer wall connected to the enclosure, and a striker extending from the outer wall. The enclosure may be configured to be received at least partially within the downtube and the recess. The outer wall may have a shape complementary to the downtube to establish at least a portion of a continuous surface comprising one or more outer surfaces of the downtube and one or more outer surfaces of the battery. The striker may be configured to engage the battery lock of the micromobility transit vehicle to lock the battery in place.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 illustrates a diagram of a user interface associated with a micromobility transit vehicle in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
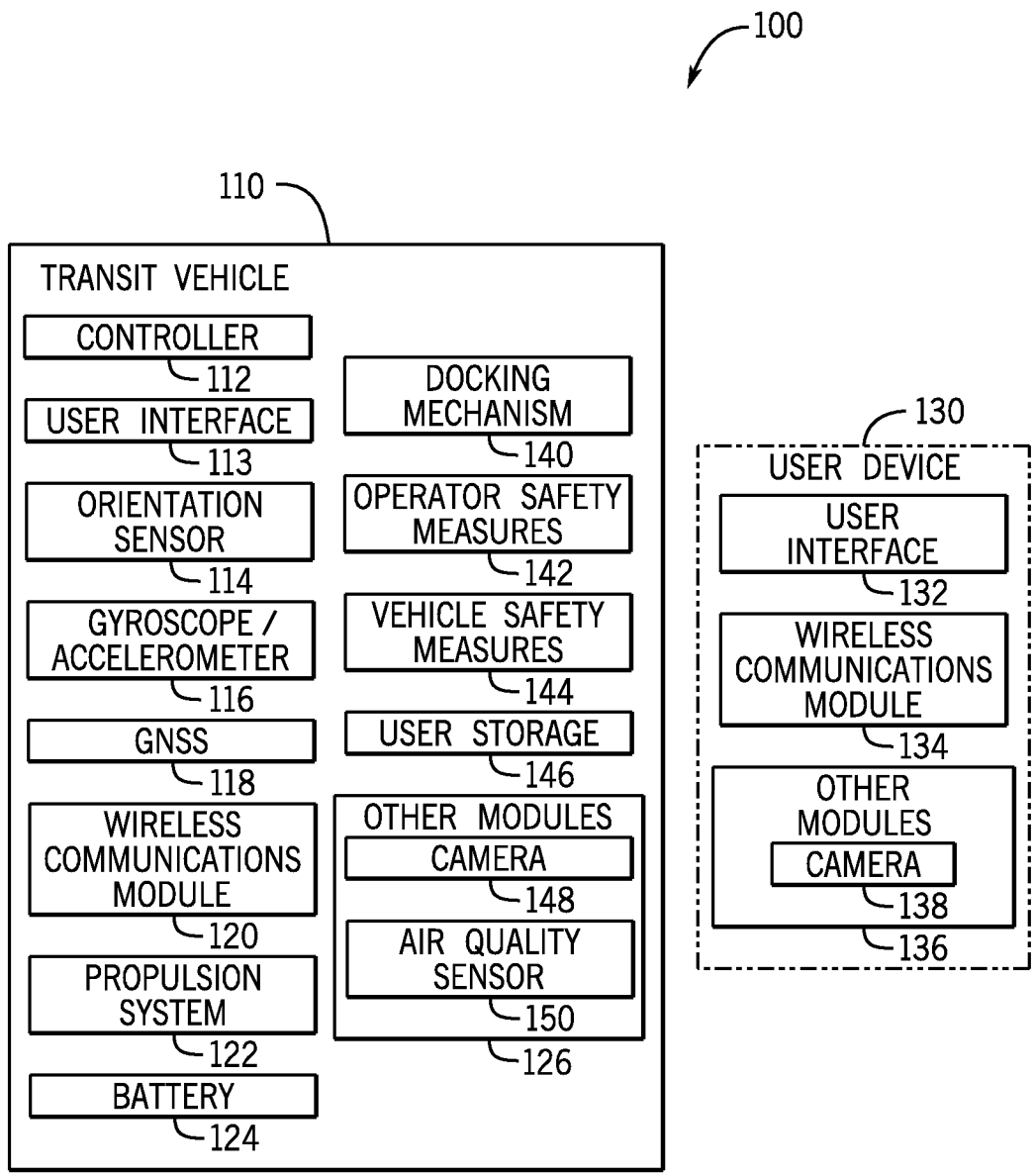
FIG. 1 illustrates a block diagram of a portion of a dynamic transportation matching system including a transit vehicle in accordance with an embodiment of the disclosure.

In accordance with various embodiments of the present disclosure, a battery of a micromobility transit vehicle (e.g., a bicycle, a kick scooter, a sit-scooter, etc.) is integrated into the frame (e.g., a downtube) of the micromobility transit vehicle to limit theft, vandalism, and other damage to the battery, as well as to reduce the noticeability of the battery itself when installed. The downtube may have a recess disposed therein, such as along its length, with the battery sized and shaped to fit (e.g., seamlessly) within the recess. To avoid theft, vandalism, and other damage, for example, to the battery, the interface between the battery and the downtube may conceal or protect the attachment points and/or mechanisms securing the battery to the downtube. For instance, a lower portion of the battery may be tucked or slid into the downtube, and once the lower portion is positioned properly, the battery may be rotated towards the downtube until an upper portion of the battery is secured to a battery lock located within the downtube. Sinking the battery at least partially into the downtube may reduce or remove pry points and the ability to get under the battery to pry the battery out of engagement with the downtube. The upper portion of the battery may include or define a shroud that conceals and protects the attachment of the battery to the battery lock. The shroud may conceal a latching area between the battery and the downtube. The shroud may also reduce or remove pry points at the latching area, limiting the ability to pry the battery at the latching area. Rotation of the battery into position may also connect the battery to an electrical connector located within the recess of the downtube. To limit ingress of water into the electrical connection, the electrical connection may be located near the headtube of the frame to keep the electrical connection elevated relative to the bottom of the recess.

The battery and downtube may include other features. For example, the battery may include a handle for carrying of the battery and a striker for securing the battery to the battery lock. Depending on the application, the handle may form or include the striker, or the handle may be separate from the striker. The handle may be connected to the shroud of the battery, such as at the top of the battery. The striker may also be connected to the shroud of the battery, such as at the top of the battery adjacent to the handle. In some embodiments, the electrical connector of the battery may be near the top of the battery, such as adjacent to the handle and/or striker. In some embodiments, a metal plate may be embedded into an outer wall of the battery to increase the battery's structural stiffness/rigidity and theft resistance, or the like. To account for any strength reduction in the downtube, such as due to the recess being formed in the downtube, the downtube may include a profile shape that increases its cross-sectional structural stiffness/strength. For instance, the downtube may include a profile shape defined by alternating ribs and grooves. One or more cables may be routed within the grooves. In some embodiments, the battery may be used as a structural member to increase the strength, stiffness, or rigidity of the downtube when the battery is positioned within the downtube, such as adding torsional stiffness to the downtube once one or more clearances between the battery and the downtube are taken up from deflection. In some embodiments, one or more features may pop at least a portion of the battery out of the recess when the battery lock is unlocked.

The interface between the battery and the downtube may facilitate insertion and/or swapping of the battery. For instance, the battery may be easily carried and placed initially into position within the recess of the downtube via the handle. Once the lower portion of the battery is initially placed into position within the recess/downtube of the frame, the battery may be easily rotated into position, such as via the weight of the battery itself, until the handle latches with the battery lock and the battery makes electrical connection with the micromobility transit vehicle. To remove the battery, the battery may simply be lifted via the handle. Lifting the battery via the handle may rotate the upper portion of the battery away from the downtube and lift the battery out of the downtube and recess. A new or charged battery may then be easily inserted in the same manner described above.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
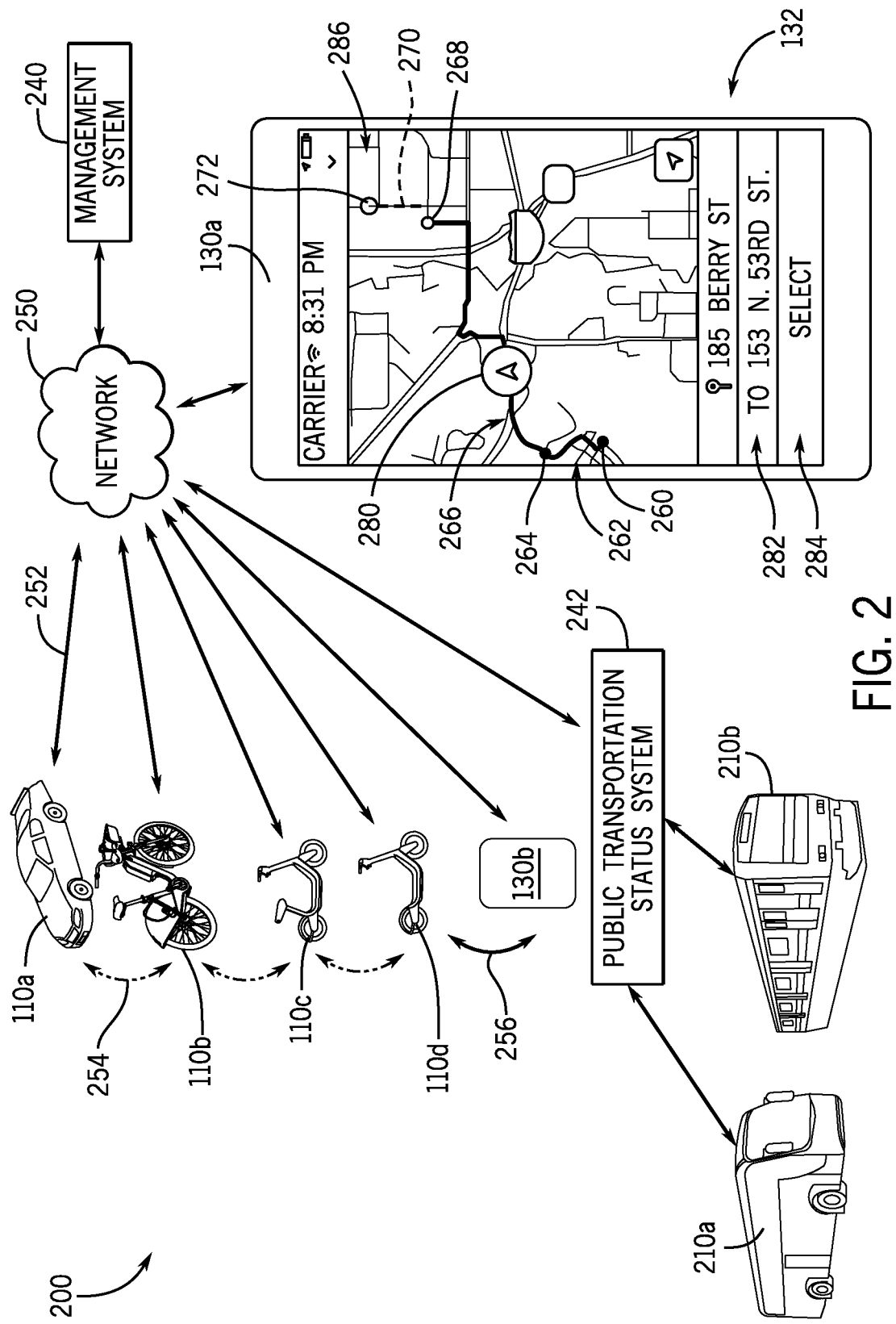
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
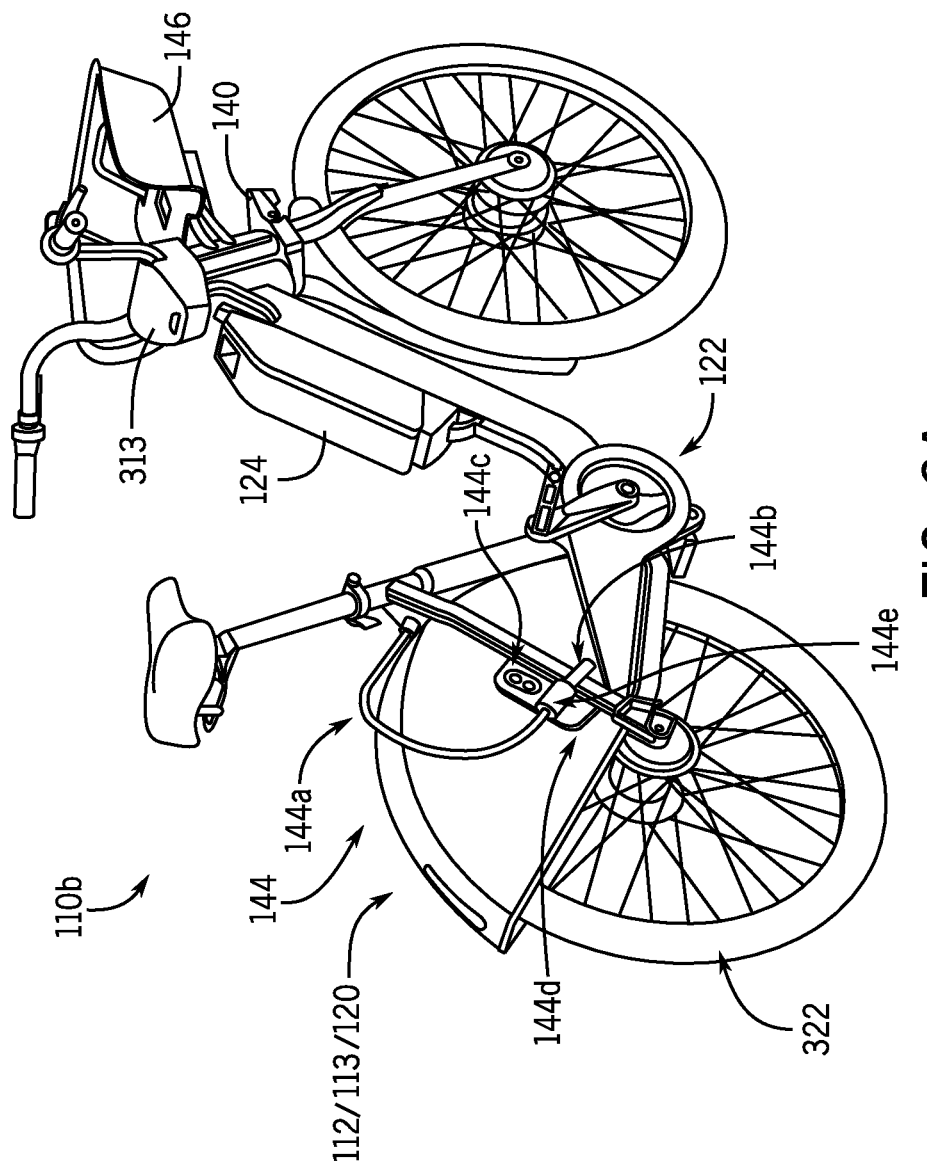
FIGS. 3A, 3B, and 3C illustrate respective diagrams of micromobility transit vehicles for use in a dynamic transportation matching system in accordance with an embodiment of the disclosure.
Figure 3B:
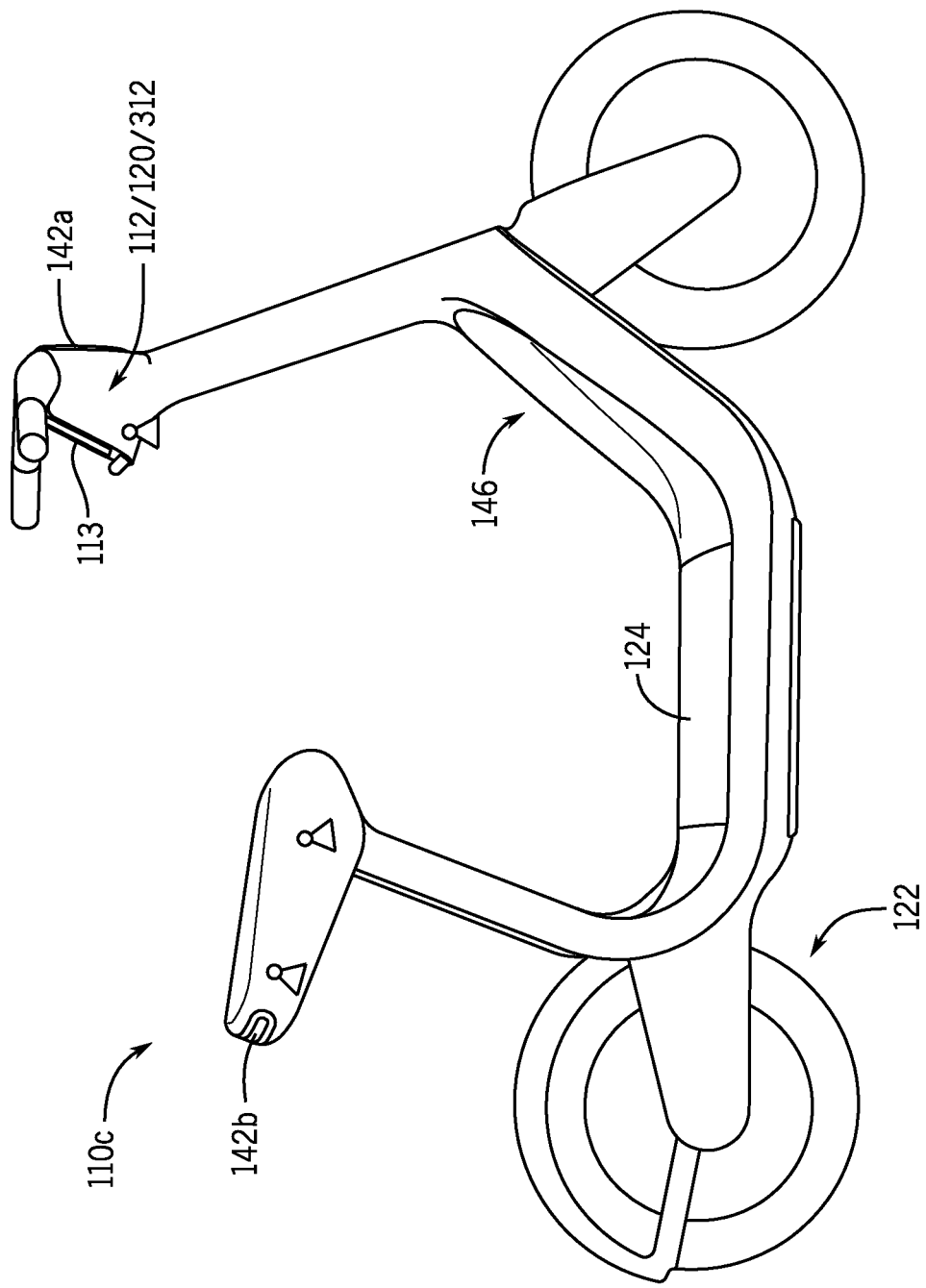
Figure 3C:
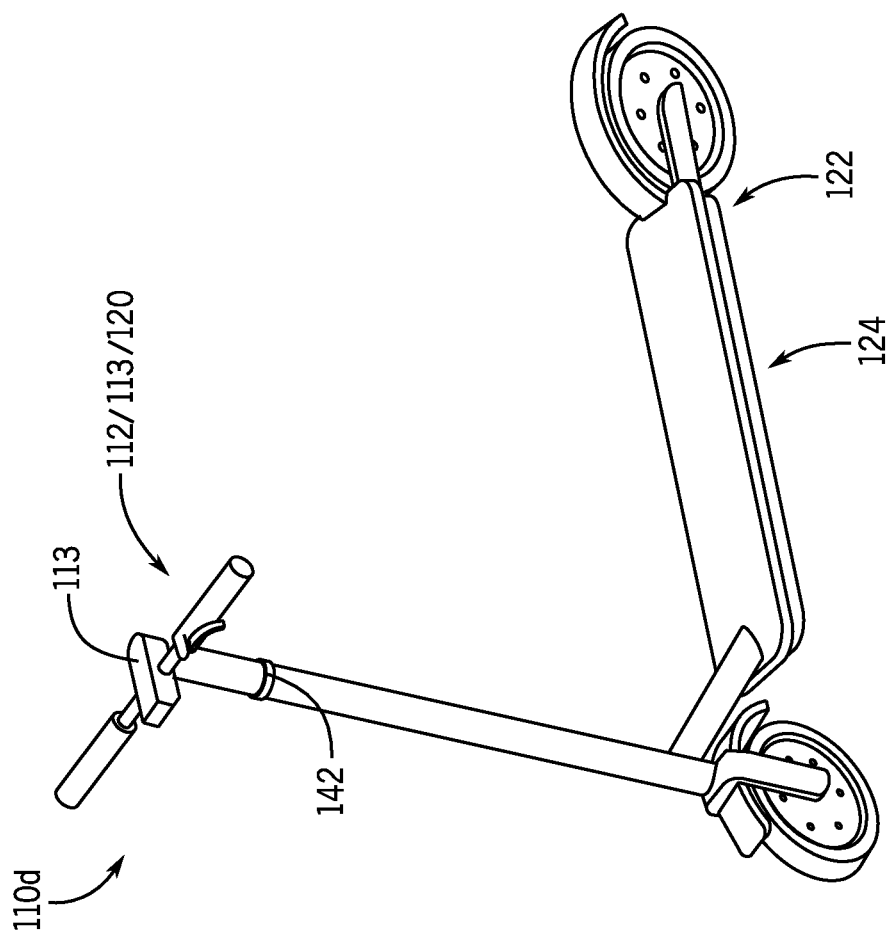

FIGS. 3A, 3B, and 3C illustrate respective diagrams of micromobility transit vehicles 110*b*, 110*c*, and 110*d*, which may be integrated network systems in accordance with an embodiment of the disclosure. For example, transit vehicle 110*b* of FIG. 3A may correspond to a motorized bicycle integrated with the various elements of system 100 and may be configured to participate in dynamic transportation matching system 200 of FIG. 2. As shown, transit vehicle 110*b* includes controller/user interface/wireless communications module 112/113/120 (e.g., integrated with a rear fender of transit vehicle 110*b*), propulsion system 122 configured to provide motive power to at least one of the wheels (e.g., a rear wheel 322) of transit vehicle 110*b*, battery 124 for powering propulsion system 122 and/or other elements of transit vehicle 110*b*, docking mechanism 140 (e.g., a spade lock assembly) for docking transit vehicle 110*b* at a docking station, user storage 146 implemented as a handlebar basket, and vehicle security device (e.g., an embodiment of vehicle security device 144 of FIG. 1), which may incorporate one or more of a locking cable 144*a*, a pin 144*b* coupled to a free end of locking cable 144*a*, a pin latch/insertion point 144*c*, a frame mount 144*d*, and a cable/pin holster 144*e*, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize transit vehicle 110*b* by default, thereby requiring a transportation requester or rider to transmit a request to management system 240 (e.g., via user device 130) to reserve transit vehicle 110*b* before attempting to use transit vehicle 110*b*. The request may identify transit vehicle 110*b* based on an identifier (e.g., a QR code, a barcode, a serial number, etc.) presented on transit vehicle 110*b* (e.g., such as by user interface 113 on a rear fender of transit vehicle 110*b*). Once the request is approved, management system 240 may transmit an unlock signal to transit vehicle 110*b* (e.g., via network 250). Upon receiving the unlock signal, transit vehicle 110*b* (e.g., controller 112 of transit vehicle 110*b*) may release vehicle security device 144 and unlock rear wheel 322 of transit vehicle 110*b*.

Transit vehicle 110*c* of FIG. 3B may correspond to a motorized sit-scooter integrated with the various elements of system 100 and may be configured to participate in dynamic transportation matching system 200 of FIG. 2. As shown in FIG. 3B, transit vehicle 110*c* includes many of the same elements as those discussed with respect to transit vehicle 110*b* of FIG. 3A. For example, transit vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of head lights, programmable light strips, and/or reflective strips.

Transit vehicle 110*d* of FIG. 3C may correspond to a motorized stand or kick scooter integrated with the various elements of system 100 and may be configured to participate in dynamic transportation matching system 200 of FIG. 2. As shown in FIG. 3C, transit vehicle 110*d* includes many of the same elements as those discussed with respect to transit vehicle 110*b* of FIG. 3A. For example, transit vehicle 110*d* may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
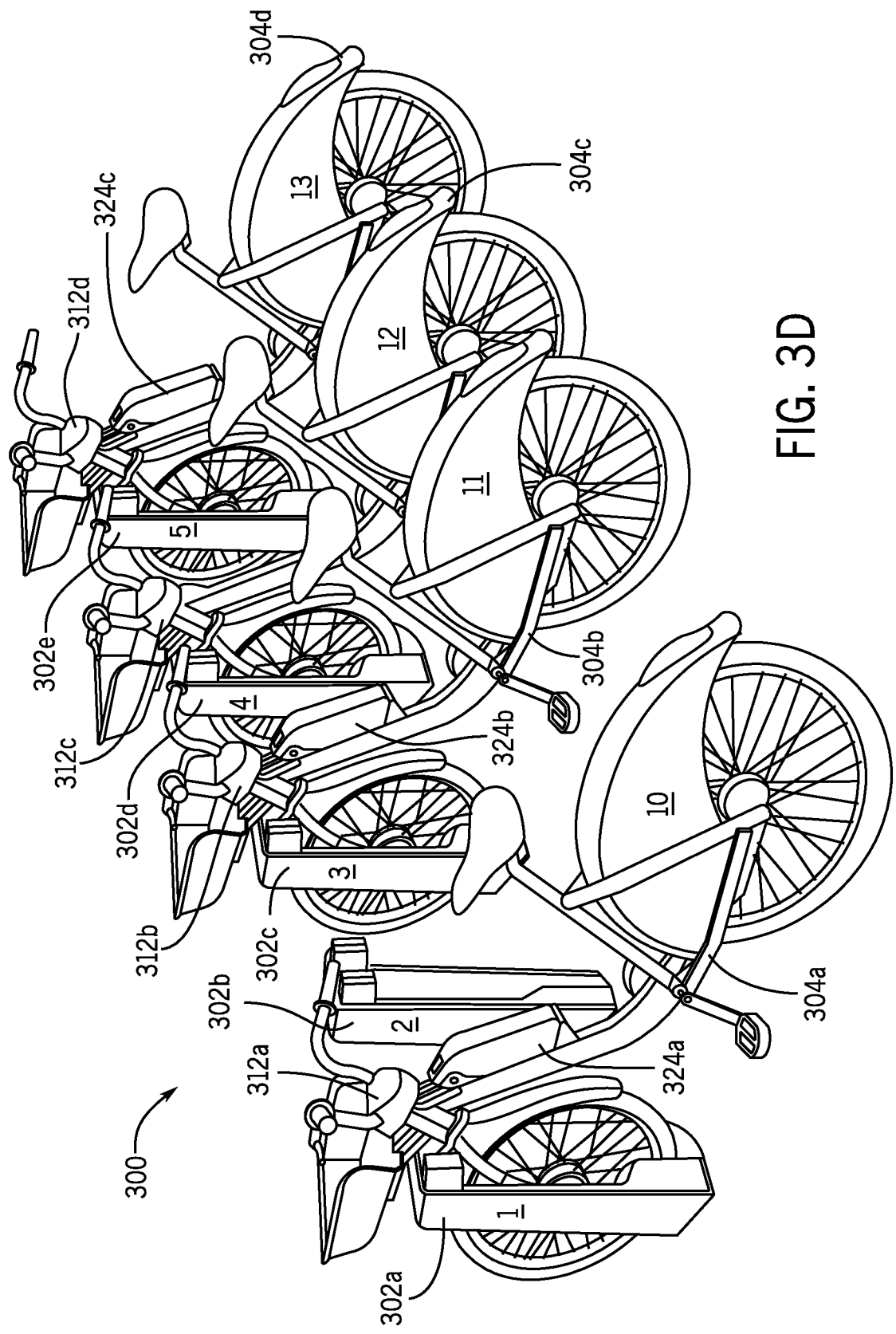
FIG. 3D illustrates a diagram of a docking station for docking one or more micromobility transit vehicles in accordance with an embodiment of the disclosure.

FIG. 3D illustrates a docking station 300 for docking transit vehicles (e.g., transit vehicles 110*c*, 110*e*, and 110*g*, etc.) according to one embodiment. As shown, docking station 300 may include multiple bicycle docks, such as docks 302*a-e*. In this example, a single transit vehicle (e.g., any one of electric bicycles 304*a-d*) may dock in each of the docks 302*a-e* of the docking station 300. Each of the docks 302*a-e* may include a lock mechanism for receiving and locking docking mechanism 140 of the electric bicycles 304*a-d*. In some embodiments, once a transit vehicle is docked in a bicycle dock, the dock may be electronically coupled to the transit vehicle (e.g., controllers 312*a-d* of the transit vehicle) via a link such that the transit vehicle and the dock may communicate with each other via the link.

A transportation requester or rider may use a user device (e.g., user device 130) to use a micromobility transit vehicle 110*b-d* that is docked in one of the bicycle docks 302*a-e* by transmitting a request to management system 240. Once the request is processed, management system 240 may transmit an unlock signal to a micromobility transit vehicle 110*b-d* docked in the dock and/or the dock via network 250. The docking station 300 may automatically unlock the lock mechanism to release the micromobility transit vehicle 110*b-d* based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of transit vehicles docked at the docking station 300, charge statuses of the docked transit vehicles, etc.) to the management system 240.

FIG. 4 illustrates a diagram of a user interface 400 associated with a micromobility transit vehicle 402 in accordance with an embodiment of the disclosure. The micromobility transit vehicle 402 may be similar to any one of transit vehicles 110*b*, 110*c*, or 110*d*, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S. patent application Ser. No. 16/578,995, entitled "MICROMOBILITY ELECTRIC VEHICLE WITH ELECTRONIC DEVICE HOLDER AND INTEGRATED DISPLAY," which is incorporated herein in its entirety for all purposes.

Figure 5A:
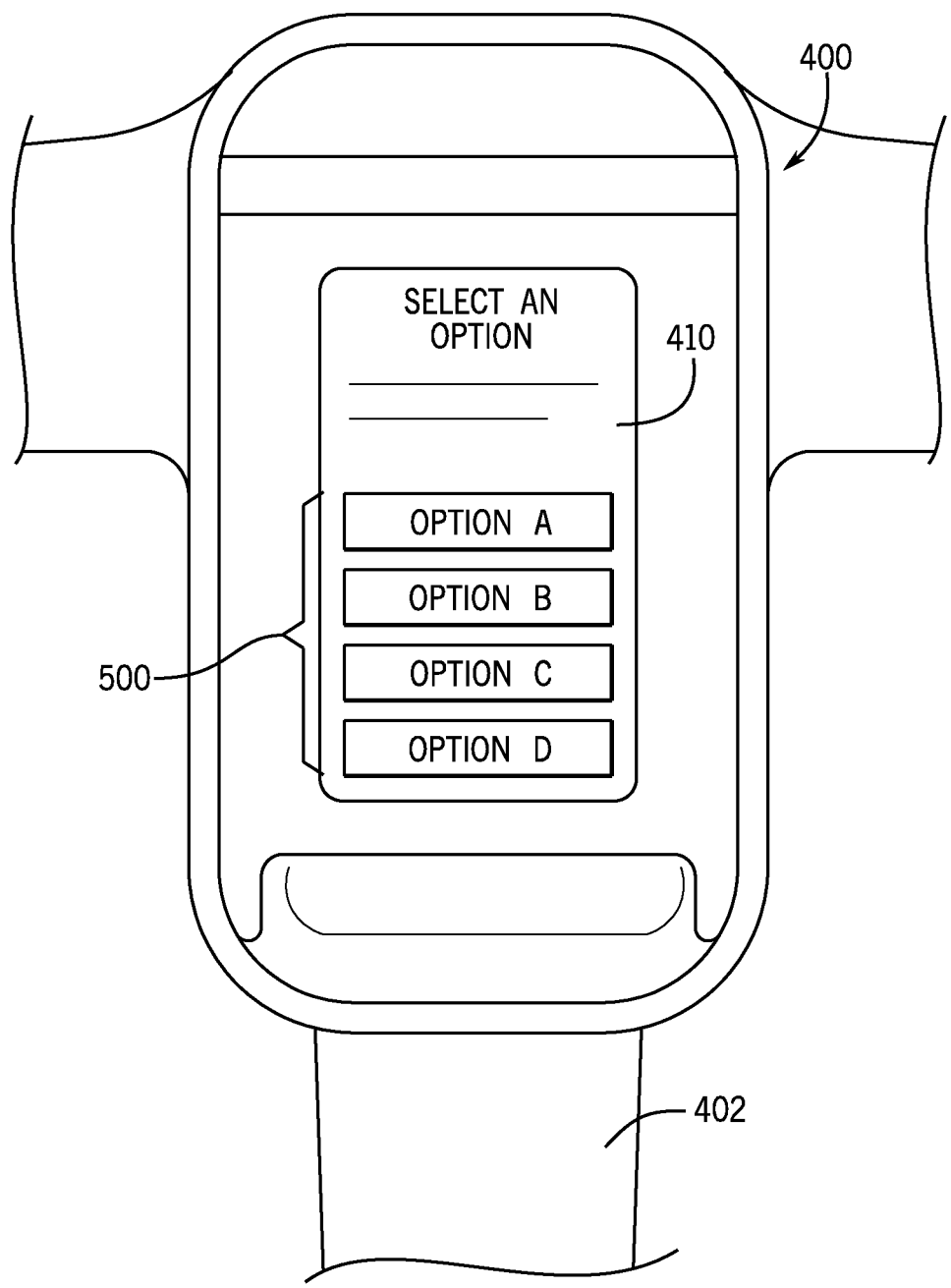
FIGS. 5A, 5B, and 5C illustrate respective diagrams of various examples of information rendered on a display of the user interface of FIG. 4 in accordance with an embodiment of the disclosure.
Figure 5B:
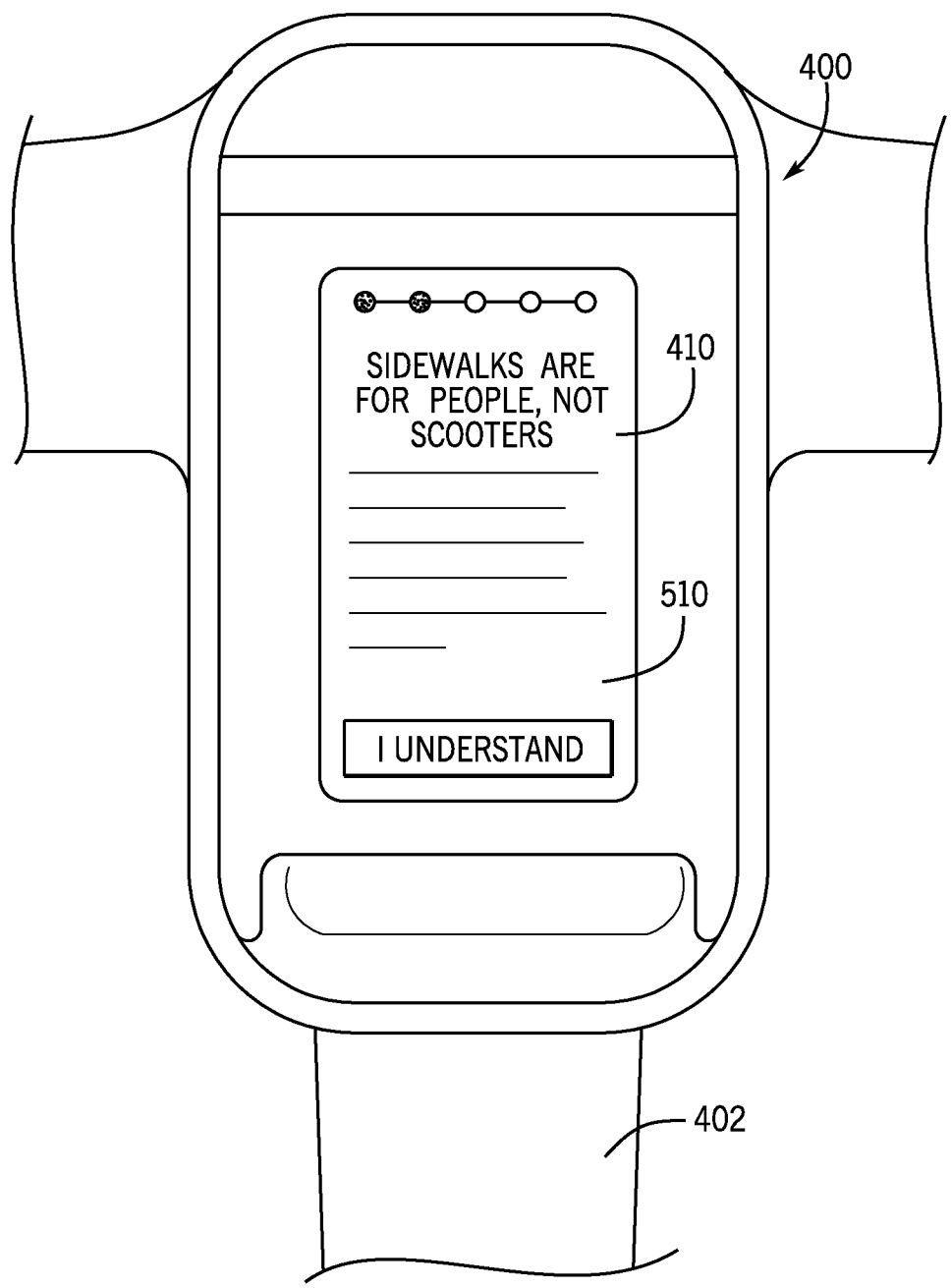
Figure 5C:
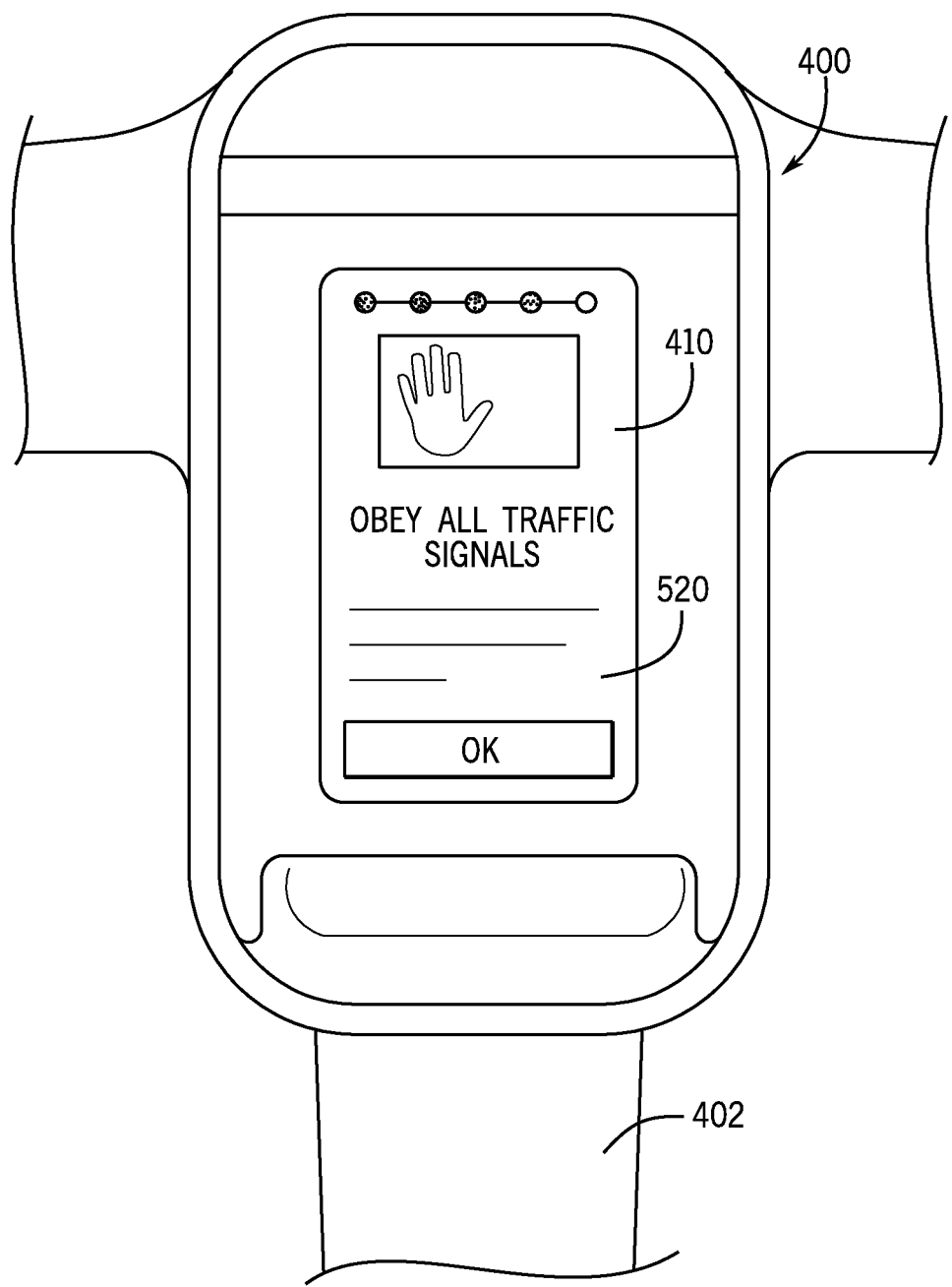

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
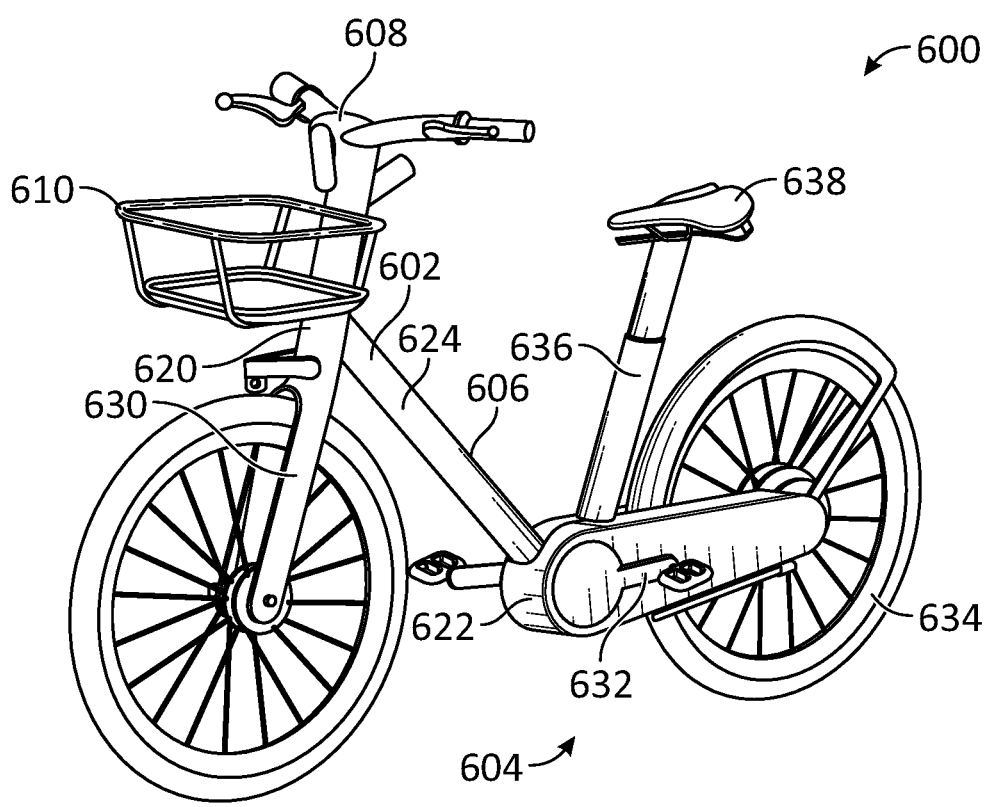
FIG. 6 illustrates a diagram of a micromobility transit vehicle in accordance with an embodiment of the disclosure.

FIG. 6 illustrates a diagram of a micromobility transit vehicle 600 in accordance with an embodiment of the disclosure. In the illustrated embodiment, the micromobility transit vehicle 600 is a bicycle, although other configurations are contemplated, including kick scooters, sit-scooters, and the like. As shown, the micromobility transit vehicle 600 includes a frame 602, a propulsion system 604, and a battery 606. In some embodiments, the micromobility transit vehicle 600 may include a cockpit assembly 608 and a storage basket 610. The micromobility transit vehicle 600 may be similar to any of the micromobility transit vehicles 110, 110b, 110c, or 110d, described above. Thus, any description above of like features is incorporated herein for micromobility transit vehicle 600.

The frame 602 may include many configurations. For example, the frame 602 may include any number of tubes, brackets, and other components. For instance, the frame 602 may include a headtube 620, a bottom bracket 622, a downtube 624 extending between the headtube 620 and the bottom bracket 622. The headtube 620 may rotatably support a front fork 630 of the micromobility transit vehicle 600, such as including a headset (with one or more bearings) allowing the front fork 630 to pivot freely. The bottom bracket 622 may rotatably support a portion of the propulsion system 604, such as a crankset 632 configured to drive a rear wheel 634 through reciprocating motion of a rider's legs. In some embodiments, the frame 602 may include other tubes, such as a seat tube 636 supporting a seat 638. In some embodiments, the frame 602 may include a top tube, though such is not required, as illustrated in FIG. 6. Thus, the frame 602 may include any number of frame members coupled together to form a support structure for the various components of the micromobility transit vehicle 600.

The propulsion system 604 may be any system or device operable to provide a motive force to at least one wheel of the micromobility transit vehicle 600 (e.g., the rear wheel 634) to propel the micromobility transit vehicle 600 across a surface (e.g., a road surface, a sidewalk, a path, a trail, etc.). The propulsion system 604 may be similar to the propulsion system 122 described above, such as including an electric motor coupled to the at least one wheel and a motor controller electronically coupled to the electric motor to control a motive force provided by the electric motor to the at least one wheel. Such embodiments are illustrative only, and the propulsion system 604 may include other features, such as a brake resistor electronically coupled to the motor controller to produce a braking torque or dynamic braking on the electric motor through electrical resistance, thereby decelerating the electric motor as desired. In some embodiments, at least some portions of the propulsion system 604 may be housed within the frame 602, such as the motor housed or concealed by the rear chain stays. As described herein, "electronically coupling" or "electronically coupled" means electrically coupled together (e.g., for power coupling), communicatively coupled together (e.g., for sensor data communication), or both electrically coupled and communicatively coupled together.

The battery 606 may be configured to provide electric power to the micromobility transit vehicle 600. For example, the battery 606 may be configured to provide electric power to the propulsion system 604 (e.g., to an electric motor) to propel the micromobility transit vehicle 600, for example, as well as to various other modules of the micromobility transit vehicle 600. The battery 606 may be implemented with one or more battery cells, controllers, and/or safety measures. For example, the battery 606 may include thermal interlocks and one or more logic devices, sensors, and/or a display to monitor and provide visual feedback of a charge status of the battery 606 (e.g., a charge percentage, a low charge indicator, etc.).

Other modules powered by the battery 606 may include other and/or additional sensors, actuators, communications modules, and/or user interface devices, for example. In some embodiments, the other modules may include one or more proximity sensors, cameras, lights (e.g., a headlight, indicator lights, etc.), alarms, environmental sensors, dynamic sensors, propulsion control systems, and the like. In some embodiments, the battery 606 may include an architecture similar to that described in U.S. patent application Ser. No. 16/728,600, entitled "VEHICLE BATTERY INTEGRATION SYSTEMS AND METHODS," or in U.S. patent application Ser. No. 16/836,259, entitled "VEHICLE BATTERY SECURING SYSTEMS AND METHODS," which are incorporated herein by reference in their entireties.

The cockpit assembly 608 may provide a functional, intuitive, and distinctive cockpit or user interface for the rider when riding the micromobility transit vehicle 600. For example, the cockpit assembly 608 may be implemented with several interfaces, components, or features allowing the rider to see, verify, or control one or more operations of the micromobility transit vehicle 600. The cockpit assembly 608 may form at least part of an outer housing for the micromobility transit vehicle's handlebars. In some embodiments, the cockpit assembly 608 may include user interface 400 described above. In some embodiments, the cockpit assembly 608 may be similar to the cockpit assembly disclosed in U.S. patent application Ser. No. 16/729,070, entitled "MICRO-MOBILITY FLEET VEHICLE COCKPIT ASSEMBLY SYSTEMS AND METHODS," which is incorporated herein in its entirety for all purposes.

The storage basket 610 may be coupled to the frame 602, such as to the headtube 620, and may provide one or more functional benefits. For instance, the storage basket 610 may be configured to store a rider's belongings during a ride. In some examples, the storage basket 610 may be configured to provide a locking function. For example, the micromobility transit vehicle 600 may be locked or otherwise secured to a docking station or other stationary object via one or more components of the storage basket 610, such as a lock cable of the storage basket 610. In some embodiments, the storage basket 610 may be similar to the storage basket disclosed in U.S. patent application Ser. No. 15/930,195, entitled "MICROMOBILITY TRANSIT VEHICLE LOCK-TO MECHANISM SYSTEMS AND METHODS," which is incorporated herein in its entirety for all purposes.

Figure 7A:
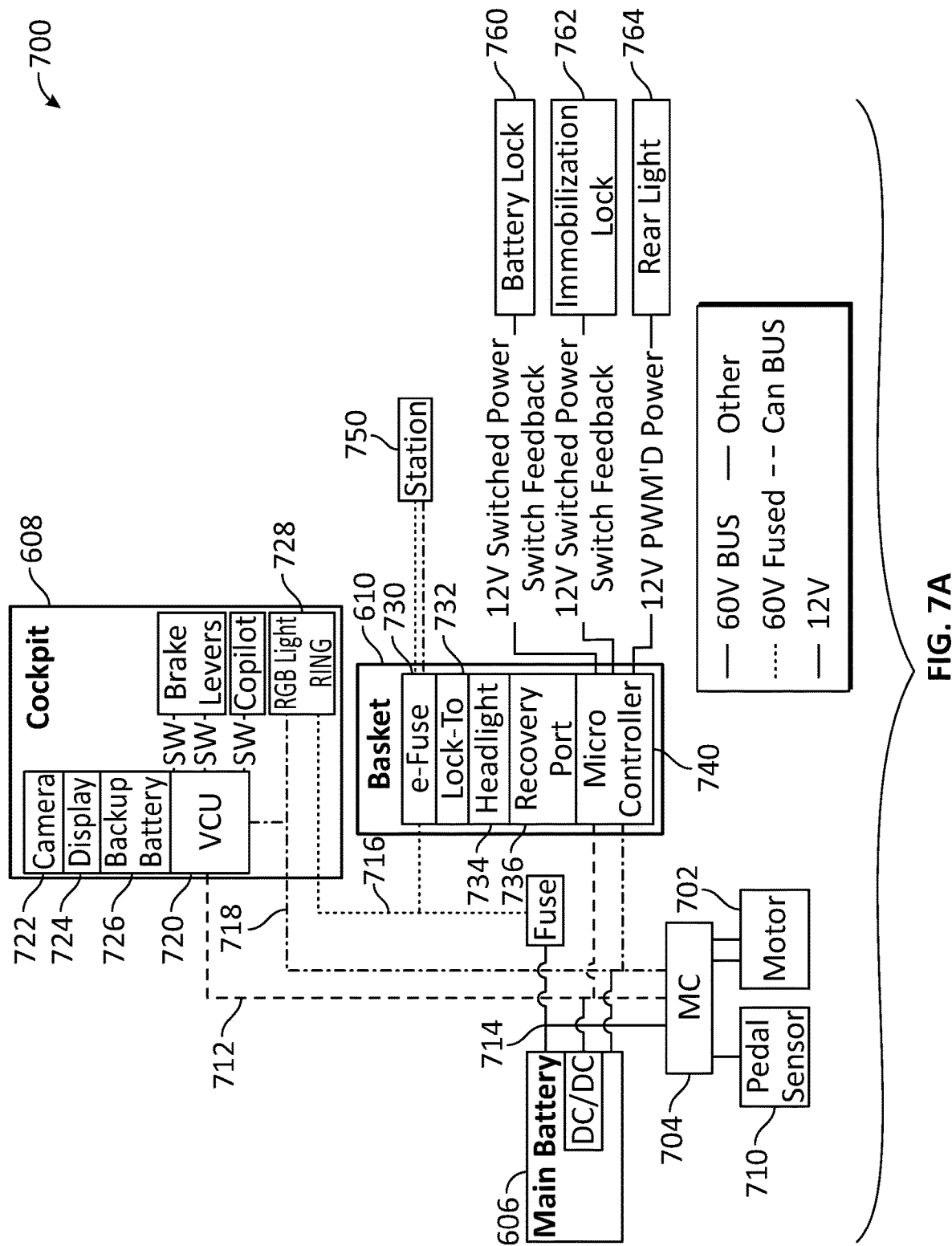
FIG. 7A illustrates a block diagram of an electrical architecture of the micromobility transit vehicle of FIG. 6 in accordance with an embodiment of the disclosure.
Figure 7B:
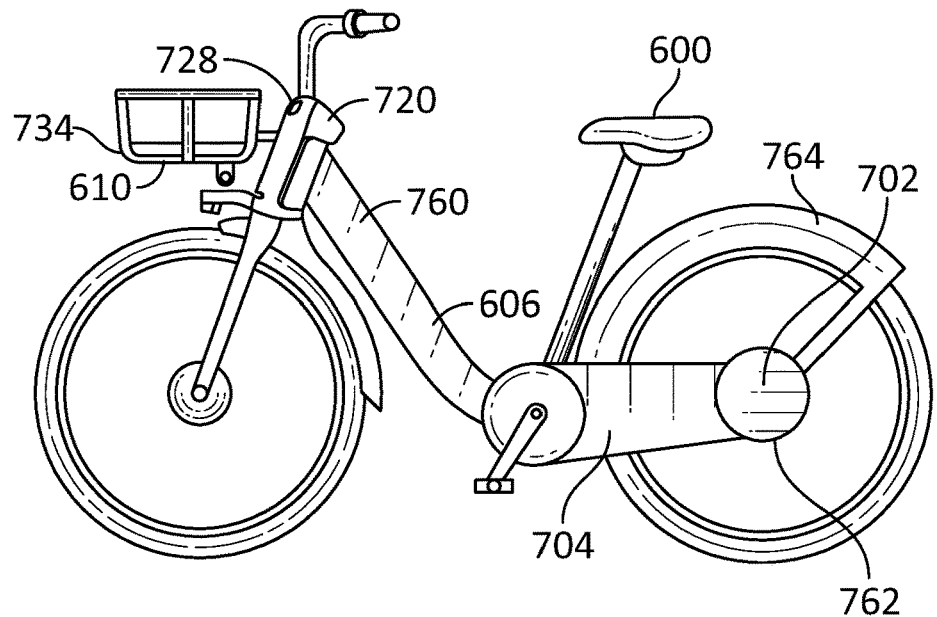
FIG. 7B illustrates a block diagram of the micromobility transit vehicle and showing the components of the electrical architecture on the micromobility transit vehicle in accordance with and embodiment of the disclosure.

FIG. 7A illustrates a block diagram of an electrical architecture 700 of the micromobility transit vehicle 600 in accordance with an embodiment of the disclosure. FIG. 7B illustrates a block diagram of the micromobility transit vehicle 600 and showing the components of the electrical architecture 700 on the micromobility transit vehicle 600 in accordance with an embodiment of the disclosure. Although the electrical architecture 700 is described with reference to micromobility transit vehicle 600, the electrical architecture 700 may be associated with any of transit vehicles 110, 110b, 110c, or 110d, described above.

As shown, the electrical architecture 700 includes the battery 606, an electric motor 702, a motor controller 704, storage basket 610, and cockpit assembly 608. In some embodiments, the electrical architecture 700 includes one or more sensor units, such as a pedal sensor 710, a cadence sensor, and a torque sensor, among others. The battery 606, electric motor 702, motor controller 704, storage basket 610, and cockpit assembly 608 may be electronically coupled in many configurations. For example, the battery 606, motor controller 704, storage basket 610, and cockpit assembly 608 may be electronically coupled via one or more signal and/or power connections, such as one or more 12V power supply connections 712, one or more 60V bus connections 714, one or more 60V fused connections 716, or one or more controller area network (CAN) bus connections 718.

The cockpit assembly 608 may include a vehicle control module (VCU) 720, a camera 722, and a display 724. In some embodiments, the cockpit assembly 608 may include a backup battery 726 and a light ring 728. In some embodiments, the cockpit assembly 608 may include one or more other modules, such as a cellular module, an audio module, an NFC module, a brake lever module, a copilot module, and a navigation module, or any combination thereof.

The storage basket 610 may include a charging circuit 730, a lock-to mechanism 732, a head light 734, a recovery port 736, and a microcontroller 740, or any combination thereof. In this manner, the storage basket 610 may be referred to as a smart basket. The charging circuit 730 may be electronically coupled to a charging device, such as a docking station 750, to charge the battery 606 of the micromobility transit vehicle 600. The recovery port 736 may be a data connection, such as a USB connection, to one or more electrical components of the storage basket 610. The microcontroller 740 may be electronically coupled to one or more components or devices of the micromobility transit vehicle 600. For example, the microcontroller 740 may be electronically coupled to a battery lock 760, an immobilization lock 762, and a tail light 764 of the micromobility transit vehicle 600. The connection between the microcontroller 740 and each of the battery lock 760 and immobilization lock 762 may be a 12V switched power feedback connection. The connection between the microcontroller and the tail light may be a 12V pulse width modulation connection. In such embodiments, the microcontroller 740 may control operation of the battery lock 760, the immobilization lock 762, and the tail light 764. The battery lock 760 may selectively lock the battery 606, such as to prevent battery theft, as explained below. The immobilization lock 762 may selectively lock the rear wheel 634, such as to prevent movement and/or theft of the micromobility transit vehicle 600.

Figure 8:
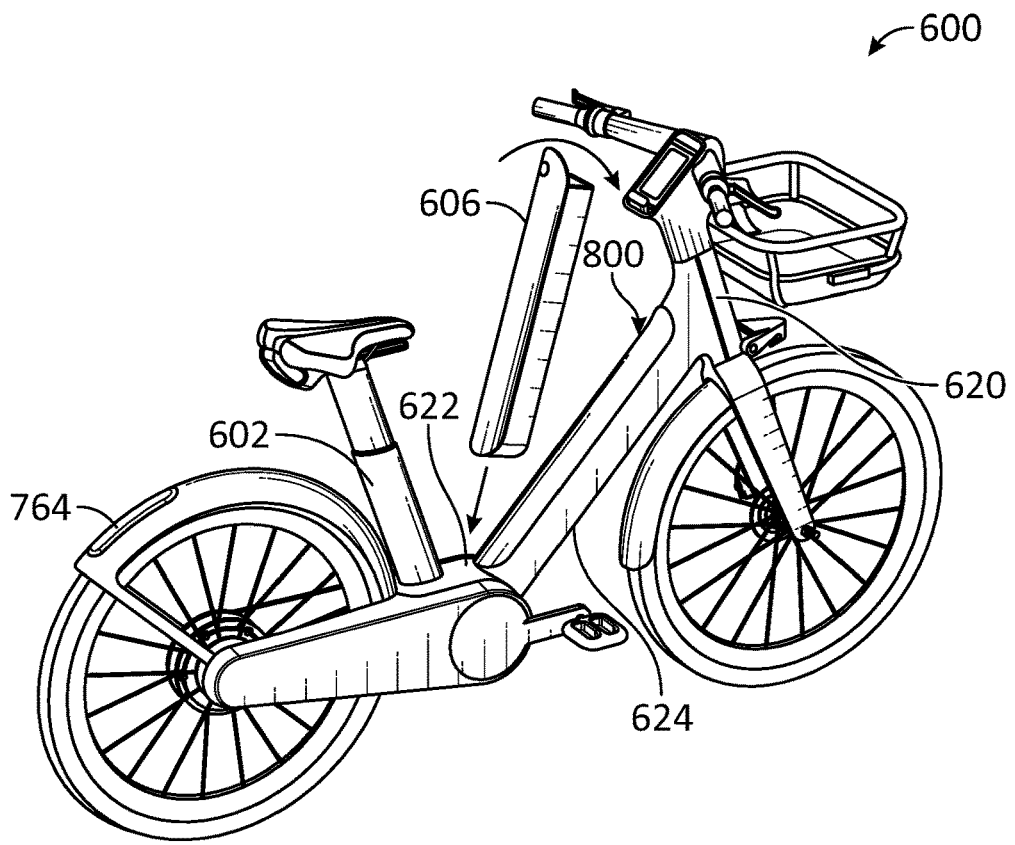
FIG. 8 illustrates a partially exploded view of the micromobility transit vehicle of FIG. 6 in accordance with an embodiment of the disclosure.

FIG. 8 illustrates a partially exploded view of the micromobility transit vehicle 600 in accordance with an embodiment of the disclosure. Referring to FIG. 8, the downtube 624 may have a recess 800 disposed therein. As shown, the recess 800 may be created in, formed in, defined in, or otherwise provided by the downtube 624 along a length of the downtube 624 between the headtube 620 and the bottom bracket 622. Depending on the application, the recess 800 may extend along a majority of the length of the downtube 624, along the entire length of the downtube 624, or along any suitable portion (length or location) of the downtube 624. In some embodiments, the recess 800 may extend from adjacent to the headtube 620 to adjacent to the bottom bracket 622. As shown, the recess 800 may extend along an upper portion of the downtube 624, such as along the top of the downtube 624. In some embodiments, the recess 800 may extend along other portions of the downtube 624, such as along a left side of the downtube 624, along a right side of the downtube 624, or along an underside of the downtube 624. Although the recess 800 is shown and described as disposed in the downtube 624, the recess 800 may be disposed in a different tube of the frame 602, such as in the seat tube 636, in the top tube, in a combination of two or more tubes, or the like. Thus, reference to the recess 800 disposed in the downtube 624 of the frame 602 is by way of example only.

With continued reference to FIG. 8, the battery 606 may be receivable within the downtube 624 and the recess 800 of the downtube 624. As a result, the battery 606 may be integrated into or placed within the frame 602, rather than exposed. For example, at least a portion of the battery 606 may be positioned within the recess 800 of the downtube 624 to secure the battery 606 to the frame 602. In such embodiments, the recess 800 may be shaped to receive the battery 606 or at least a portion of the battery 606 therein. As explained more fully below, such configurations may provide a secure attachment of the battery 606 to the frame 602. Such configurations may also provide an attachment that is less prone to vandalism and/or damage or at least limits vandalism and/or damage to the battery 606. For example, receipt of the battery 606 at least partially within the recess 800 may shield vulnerable portions of the battery 606 positioned within the frame 602, as detailed below.

Figure 9:
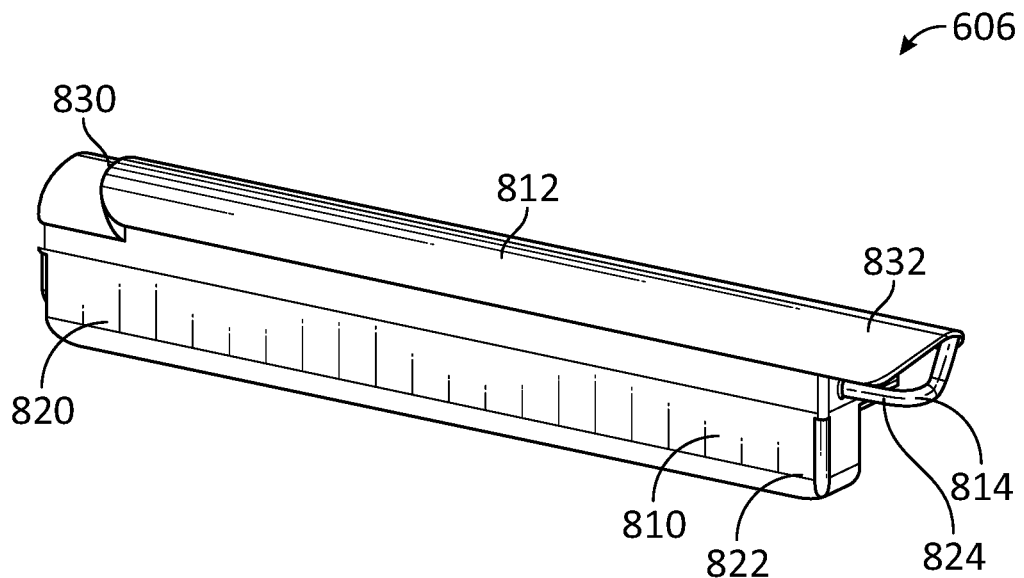
FIG. 9 illustrates a top view of a battery for a micromobility transit vehicle in accordance with an embodiment of the disclosure.
Figure 10:
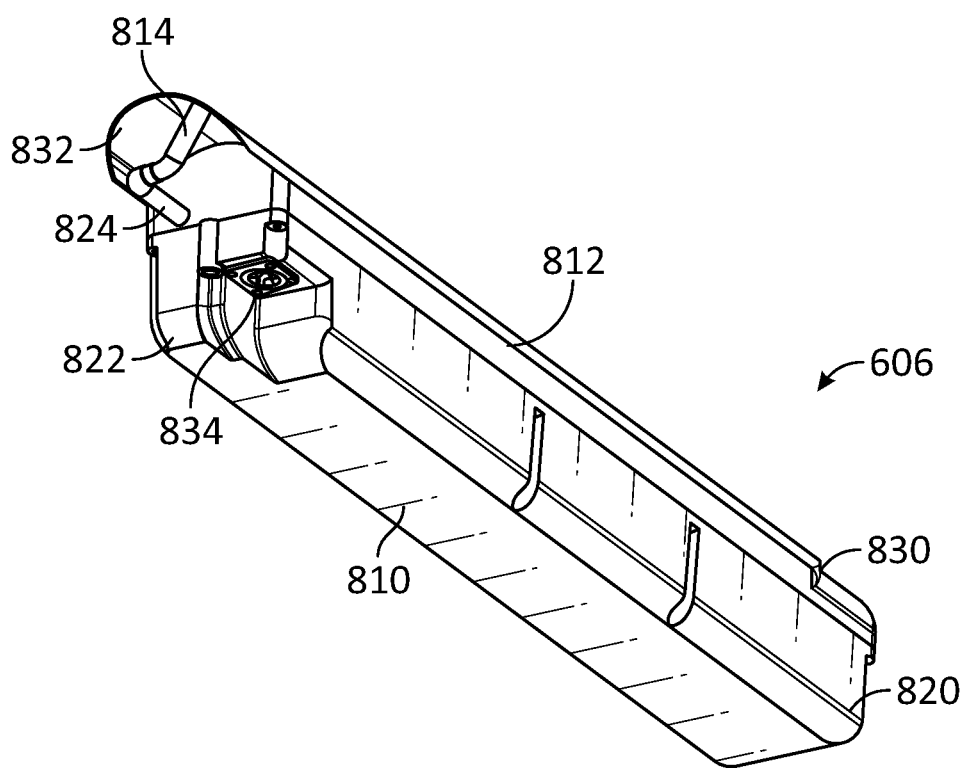
FIG. 10 illustrates a bottom view of the battery of FIG. 9 in accordance with an embodiment of the disclosure.

FIG. 9 illustrates a top view of the battery 606 in accordance with an embodiment of the disclosure. FIG. 10 illustrates a bottom view of the battery 606 in accordance with an embodiment of the disclosure. Referring to FIGS. 9 and 10, the battery 606 may include many configurations. For example, the battery 606 may include an enclosure 810, an outer wall 812 connected to the enclosure 810, and a handle 814 extending from the outer wall 812, such as between the enclosure 810 and the outer wall 812. The enclosure 810 may house one or more battery cells. The enclosure 810 may be rated against dust and water intrusion. For example, the enclosure 810 may be sealed and have an IP67 ingress rating under the Ingress Protection Code. In some embodiments, the enclosure 810 may include one or more structural features. For instance, the enclosure 810 may include an aluminum pack (for stiffness), leadscrew style locking, and/or a shape providing increased torsional stiffness, among other features.

The enclosure 810 may include a first end 820 and an opposing second end 822. As described below, the first end 820 may be receivable within the downtube 624 of the frame 602, and the second end 822 may be receivable within the recess 800. For instance, the first end 820 of the enclosure 810 may be seated within the downtube 624 and the second end 822 of the enclosure 810 may be rotated into the recess 800 of the downtube 624 to connect the battery 606 to the frame 602 of the micromobility transit vehicle 600.

The outer wall 812 may extend from the enclosure 810 or may be defined as part of the enclosure 810. For instance, the outer wall 812 may be formed integrally with at least a portion of the enclosure 810, such as the enclosure 810 and the outer wall 812 formed together through injection molding, blow molding, machining, or the like. The outer wall 812 may have an arcuate shape to complement the recess 800 disposed in the downtube 624 of the frame 602. For instance, the outer wall 812 may be shaped to match or generally match the shape of the recess 800 within the downtube 624, such that the outer wall 812 fits within and generally fills the opening of the recess 800. In some embodiments, the outer wall 812 may include one or more strengthening features. For example, a metal plate may be embedded in the outer wall 812 to increase the strength and/or rigidity of the outer wall 812 or battery 606 and/or improve theft resistance. In some embodiments, the outer wall 812 (or at least portions of the outer wall 812) may be metal for increased strength or durability of the outer wall 812 or battery 606 and/or improve resistance to vandalism (e.g., from theft, arson, etc.).

In some embodiments, the outer wall 812 may be offset from the enclosure 810. For instance, the outer wall 812 may be offset inwardly at the first end 820, such as the outer wall 812 offset from the first end 820 of the enclosure 810 towards the second end 822 to define a reduced thickness at the first end 820 compared to the second end 822. For example, the upper portion of the battery 606 at the first end 820 may have a stepped shape, such as the battery 606 including a step 830 from the first end 820 of the enclosure 810 to the outer wall 812. The outer wall 812 may also be offset from the second end 822 of the enclosure 810. As shown, the outer wall 812 may be offset outwardly at the second end 822, such as the outer wall 812 extending beyond and away from the second end 822. In some embodiments, the outer wall 812 (or at least a portion thereof) may be cantilevered from the second end 822 of the housing. As a result, the outer wall 812 at the second end 822 may define an overhang structure or shroud 832.

The offset nature of the outer wall 812 relative to the enclosure 810 may allow the battery 606 to be connected to the frame 602 of the micromobility transit vehicle 600. For instance, the reduced thickness of the battery 606 at the first end 820 may allow the first end 820 of the battery 606 to be seated within the downtube 624 of the frame 602. For example, at least a portion of the battery 606 may sink into the downtube 624 to connect the battery 606 to the frame 602. In some embodiments, the shape of the battery 606 (e.g., the first end 820) may allow the first end 820 to sink into the downtube 624. The first end 820 may sink into the downtube 624 until the step 830 of the battery 606 engages the downtube 624, such as the step 830 engaging a portion of the downtube 624 defining the recess 800. Sinking the battery 606 at least partially into the downtube 624 may discourage vandalism and/or theft. For instance, sinking the battery 606 at least partially into the downtube 624 may reduce or remove pry points and thus the ability to get under the battery 606 to pry the battery 606 out of engagement with the downtube 624. The offset nature of the outer wall 812 at the second end 822 may accommodate locking of the battery 606 to the frame 602, as detailed below. For instance, the shroud 832 may conceal a latching area between the battery 606 and the downtube 624. The shroud 832 may reduce or remove pry points at the latching area, limiting the ability to pry the battery 606 at the latching area.

The handle 814 may extend from the second end 822 of the enclosure 810 to the shroud 832 defined by the outer wall 812. Depending on the application, the handle 814 may be embedded or in-molded to the enclosure 810 and/or outer wall 812 of the battery 606 or may be fastened to the enclosure 810 and/or outer wall 812. The handle 814 may provide one or more functional characteristics. For example, the battery 606 may be manipulated via the handle 814, such as the battery 606 carried by the handle 814, placed into position within the frame 602 of the micromobility transit vehicle 600 by the handle 814, or removed from the frame 602 by the handle 814, among others. In some embodiments, the handle 814 may function to secure the battery 606 to the downtube 624 of the micromobility transit vehicle 600. For example, the handle 814 may include, define, or otherwise function as a striker 824 for a battery lock configured to secure the battery 606 in place, as explained more fully below.

Referring to FIG. 10, the battery 606 may include other features. For example, the battery 606 may include an electrical connector 834. The electrical connector 834 may be configured to electrically connect the battery 606 to a charger and/or the electrical system of the micromobility transit vehicle 600. For example, positioning the battery 606 within the downtube 624 and recess 800 may electrically connect the electrical connector 834 with the electrical system of the micromobility transit vehicle 600. As shown, the electrical connector 834 may be positioned at the second end 822 of the enclosure 810, such as adjacent to the handle 814, although other configurations are contemplated.

Figure 11:
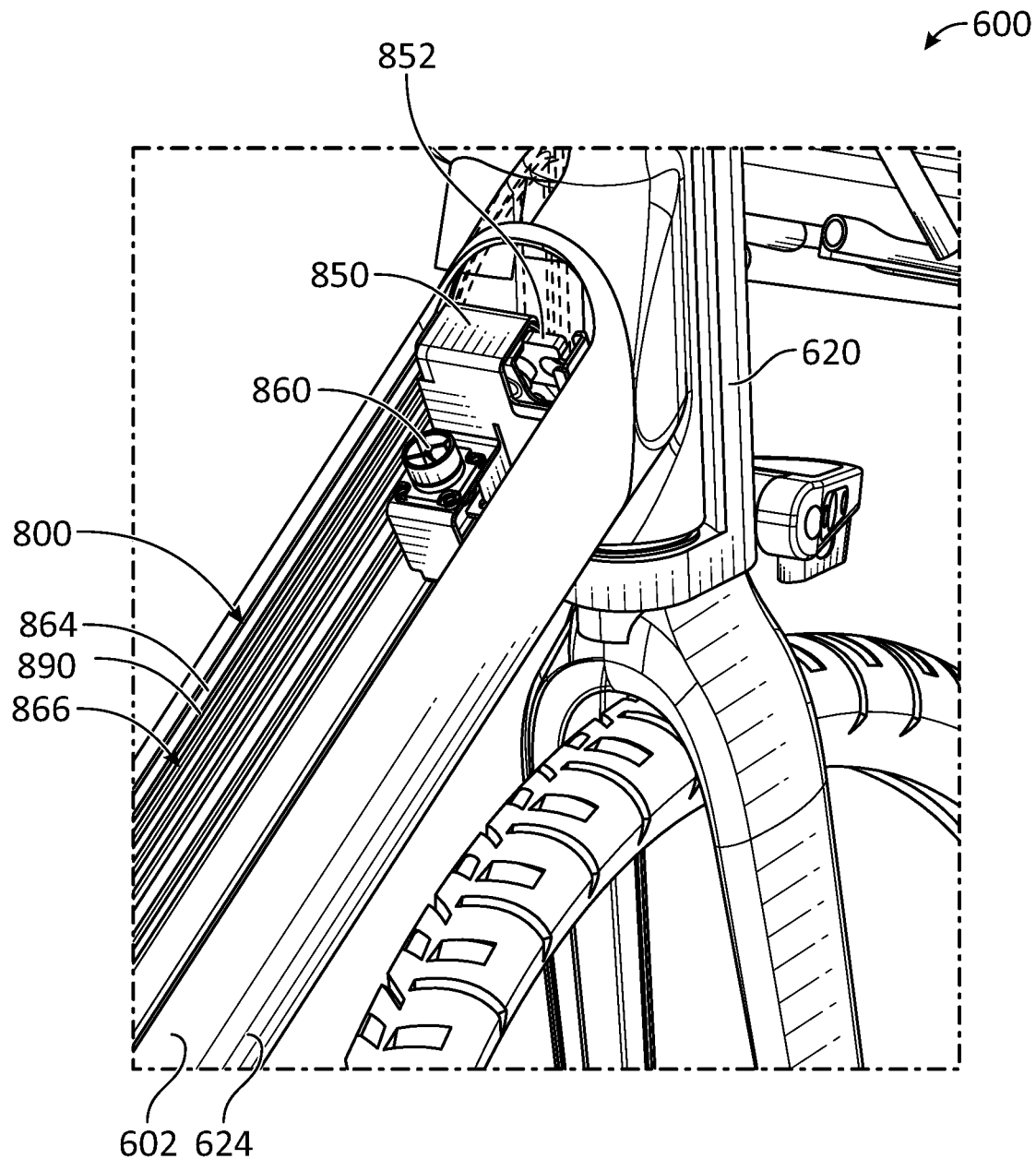
FIG. 11 illustrates a diagram of a battery lock within a recess disposed in a downtube of a micromobility transit vehicle in accordance with an embodiment of the disclosure.

FIG. 11 illustrates a diagram of a battery lock 850 in accordance with an embodiment of the disclosure. The battery lock 850 may be similar to the battery lock 760 discussed above. As shown in FIG. 11, the battery lock 850 may be located within the recess 800. In one embodiment, the battery lock 850 may be positioned within the recess 800 near or adjacent to the headtube 620 of the frame 602. As described herein, the battery lock 850 is configured to engage the battery 606 to lock the battery 606 in place. For example, the battery lock 850 may be configured to engage the handle 814 of the battery 606 (e.g., the striker 824) to lock the battery 606 in place.

The battery lock 850 may include many configurations. As shown in FIG. 11, the battery lock 850 may include a latch 852. The latch 852 may be configured to engage the handle 814/striker 824 of the battery 606 to lock the battery 606 to the battery lock 850. For example, the latch 852 may include a hook, tab, or other structure designed to selectively engage the handle 814/striker 824 of the battery 606. Once engaged with the battery 606, the latch 852 may lock the battery 606 in place and prevent removal of the battery 606 from the frame 602. For example, the battery lock 850 may automatically lock once engaged with the handle 814/striker 824 of the battery 606, or the battery lock 850 may receive one or more lock commands from management system 240 or a mobile user device (e.g., user device 130).

In one embodiment, the battery lock 850 may be an electromechanical lock. Specifically, the battery lock 850 may be operated by applying an electric current to the latch 852 or to a solenoid or other actuator controlling movement of the latch 852. For instance, applying electric current to the latch 852 (or associated actuator of the latch 852) may cause the latch 852 to lock or unlock. Depending on the application, the electromechanical lock may be fail secure or fail safe. In a fail secure configuration, application of electric current to the latch 852 (or associated actuator of the latch 852) will cause the electromechanical lock to unlock. In a fail-safe configuration, application of electric current to the latch 852 (or associated actuator of the latch 852) will cause the electromechanical lock to lock. In some embodiments, the electromechanical lock may be reversible between a fail secure configuration and a fail-safe configuration.

In another embodiment, the battery lock 850 may be an electromagnetic lock. In such an embodiment, the battery lock 850 may include an electromagnet positioned within the recess 800 of the downtube 624. When the electromagnet is energized or activated, current passing through the electromagnet creates a magnetic flux that causes the handle 814/striker 824 of the battery 606 to attract to the electromagnet, creating a locking action. To limit theft and discourage vandalism, the electromagnetic lock may be fail secure, with the battery lock 850 remaining locked when power is lost. In some embodiments, the electromagnetic lock may be fail safe, with the battery lock 850 unlocking when power is lost. Like the electromechanical lock, the electromagnetic lock may be reversible between a fail secure configuration and a fail-safe configuration.

To unlock the battery lock 850, the battery lock 850 may include one or more actuators or controllers. For example, the battery lock 850 may be smart controlled, such as controlled via one or more logic devices of the micromobility transit vehicle 600 and/or management system 240. In one embodiment, management system 240 may send one or more unlock commands to the battery lock 850 when it is desired to remove the battery 606 from the frame 602 (e.g., as requested by a rider or service technician through an app running on a mobile user device, such as user device 130). In some embodiments, the battery lock 850 may communicate directly with a mobile user device (e.g., user device 130) to receive one or more unlock commands, such as via an authentication module or other secure means. In some embodiments, the micromobility transit vehicle 600 may include an override control (e.g., an override button or actuator) to manually unlock the battery lock 850. The override control may be accessed from the headtube 620 or from an underside of the downtube 624, among other locations.

With continued reference to FIG. 11, the micromobility transit vehicle 600 may include a power connector 860 within the recess 800. The power connector 860 is engageable with the battery 606 when the battery 606 is received within the downtube 624 and the recess 800 to establish an electrical connection between the power connector 860 and the battery 606. For example, the power connector 860 may be positioned within the recess 800 to engage the electrical connector 834 of the battery 606 to electrically connect the battery 606 to the electrical system of the micromobility transit vehicle 600. In some embodiments, the power connector 860 may be adjacent to the battery lock 850. As shown, the power connector 860 may be adjacent to the headtube 620. Such configurations may limit or prevent one or more connection failures between the battery 606 and the power connector 860. For example, positioning the electrical connection between the battery 606 and the micromobility transit vehicle 600 near the headtube 620 may limit or prevent the electrical connection from getting wet or otherwise short circuiting due to moisture or other debris entering and building up within the recess 800 of the downtube 624. In some embodiments, the micromobility transit vehicle 600 may include one or weep holes or other drainage features allowing fluid to drain from within the recess 800.

As shown in FIG. 11, the downtube 624 may include one or more strengthening features accounting for the removal of material to define the recess 800. For example, the downtube 624 may have a profile shape within the recess 800 defined by alternating ribs 864 and grooves 866, although other configurations are contemplated, such as castings, forgings, extrusions, and/or hydroforming, among other configurations for shaping various ductile metals, such as aluminum, brass, low alloy steel, and stainless steel into lightweight, structurally stiff and strong pieces. Such and other configurations may increase the cross-sectional strength and/or structural stiffness/rigidity of the downtube 624 to account for any strength reduction due to the recess 800 being formed in the downtube 624. In some embodiments, the battery 606 (e.g., the enclosure 810) may be used as a structural member to increase the strength, stiffness, or rigidity of the downtube 624 when the battery 606 is positioned within the downtube 624. For example, the enclosure 810 may add torsional stiffness to the downtube 624 once one or more clearances between the enclosure 810 and the downtube 624 are taken up from deflection. In some embodiments, one or more cables 890 may be routed within the grooves 866. Depending on the application, the cables 890 may be electrical cables (e.g., power cables, communication cables, data cables, etc.) or control cables (e.g., brake cables, throttle cables, etc.), among others, or any combination thereof. For example, one or more brake cables may be routed within the grooves 866 from the brakes to the headtube 620.

Figure 12:
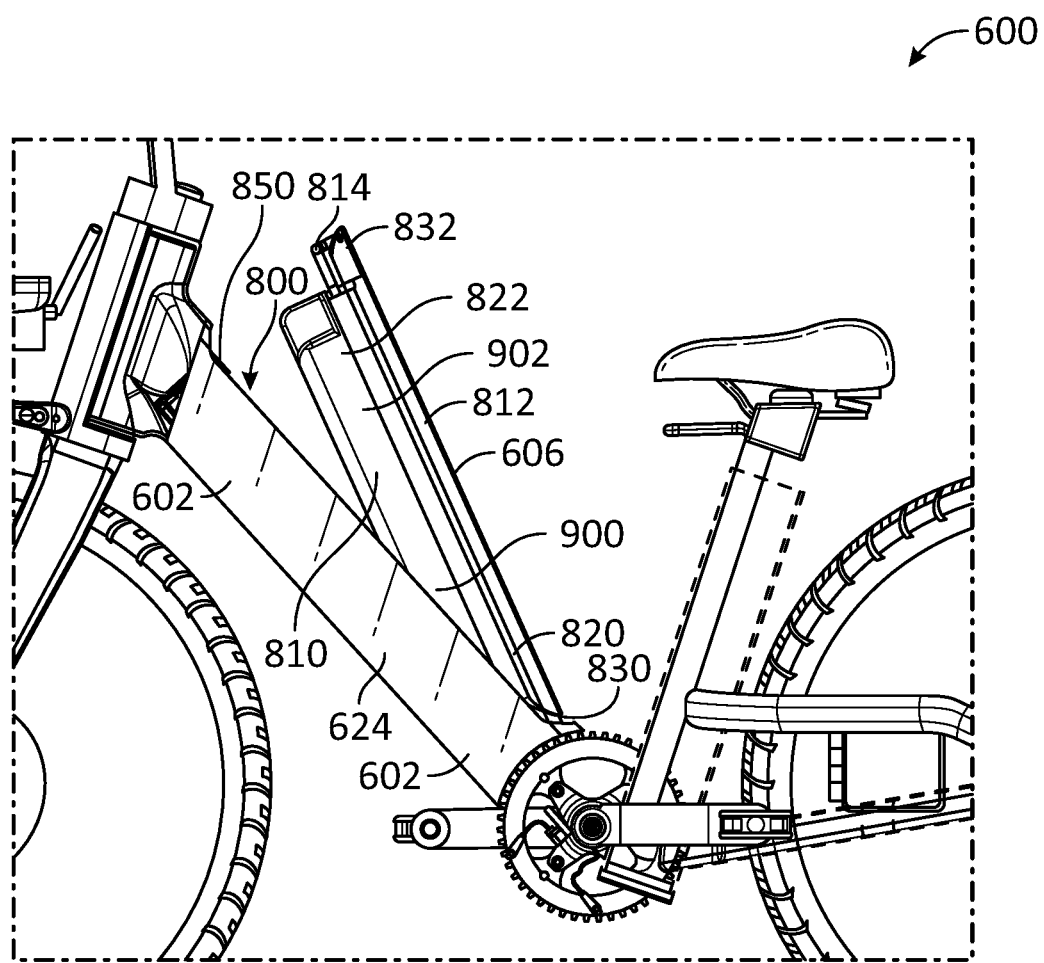
FIG. 12 illustrates a diagram of the battery initially positioned within the recess of the downtube in accordance with an embodiment of the disclosure.
Figure 13:
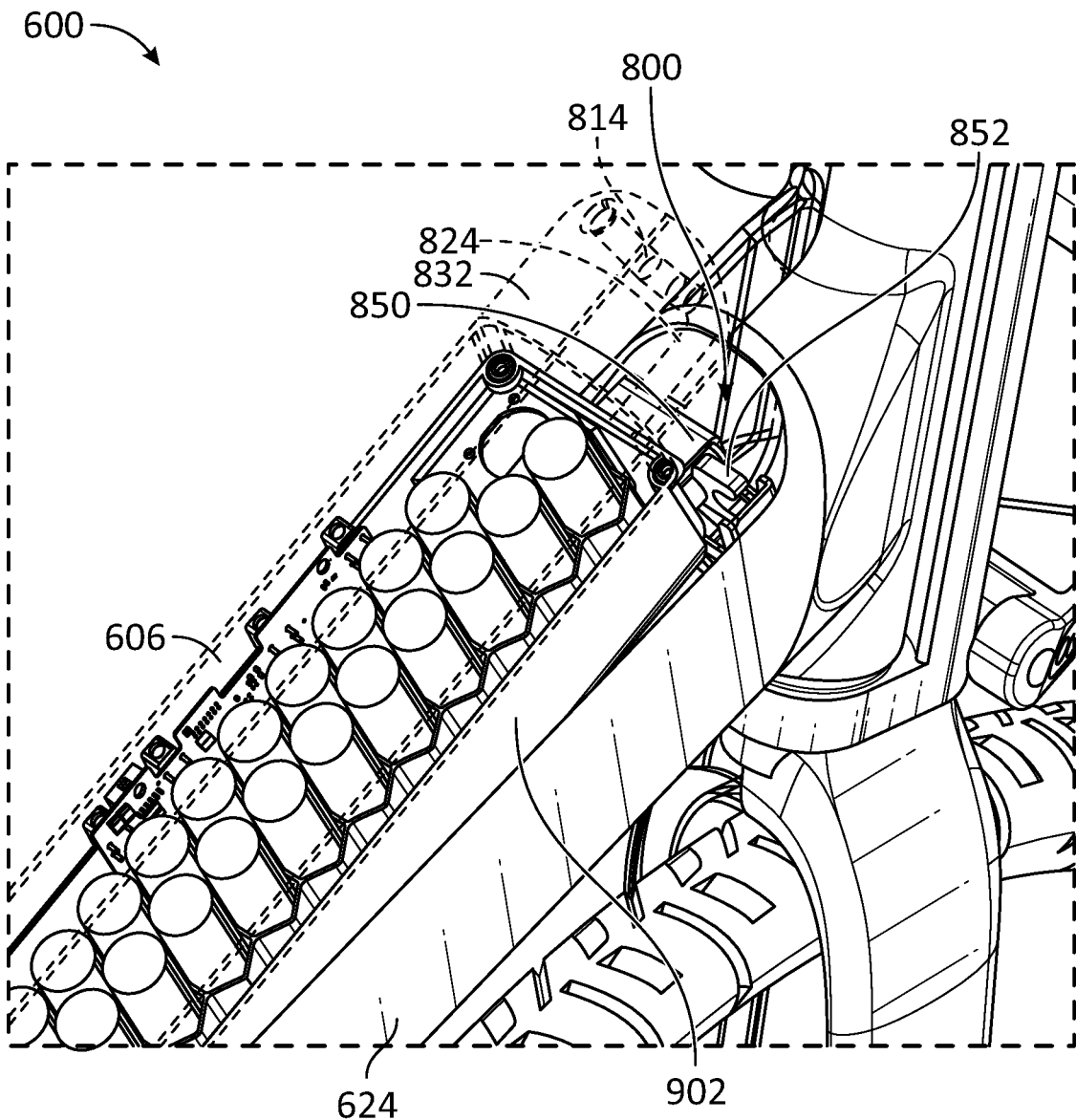
FIG. 13 illustrates a diagram of the battery further positioned within the recess of the downtube and positioned for engagement with the battery lock in accordance with an embodiment of the disclosure. An outer wall of the battery is illustrated as transparent for illustration purposes only.
Figure 14:
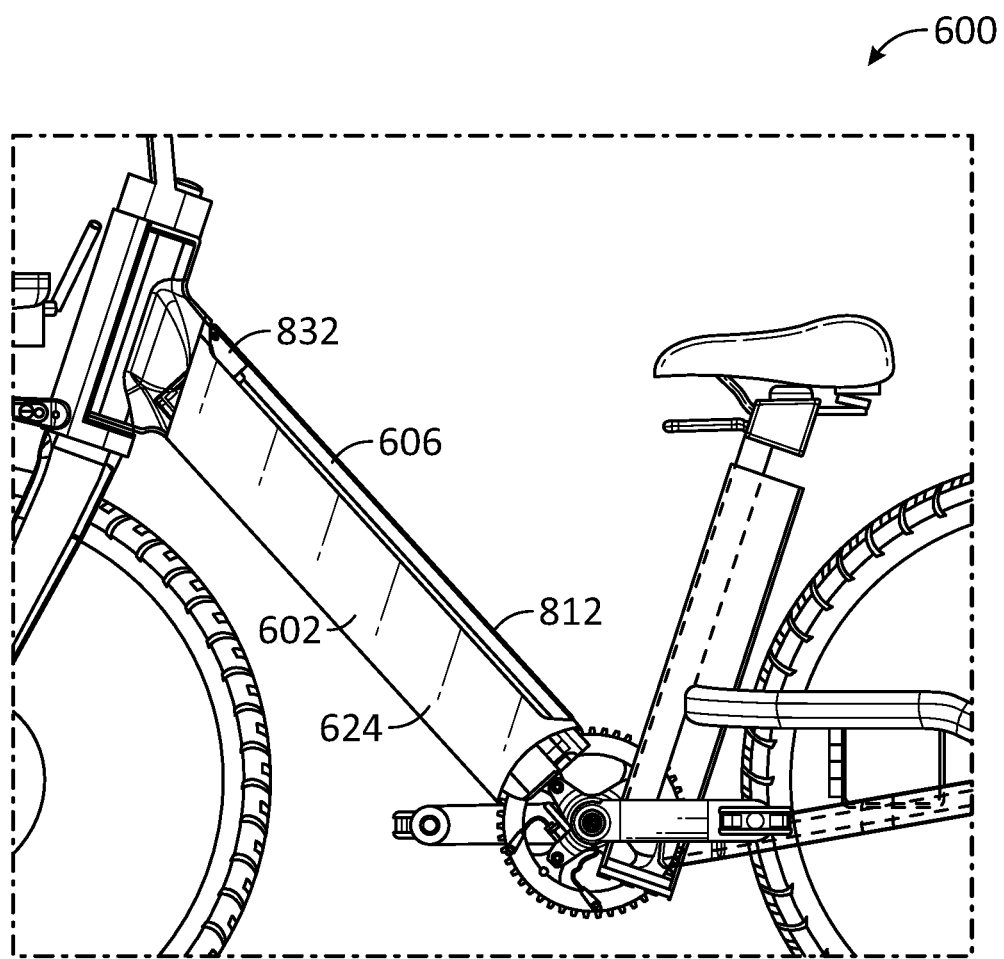
FIG. 14 illustrates a diagram of the battery locked within the recess of the downtube in accordance with an embodiment of the disclosure.

FIG. 12 illustrates a diagram of the battery 606 initially positioned within the recess 800 in accordance with an embodiment of the disclosure. FIG. 13 illustrates a diagram of the battery 606 further positioned within the recess 800 and positioned for engagement with the battery lock 850 in accordance with an embodiment of the disclosure. FIG. 14 illustrates a diagram of the battery 606 locked within the recess 800 in accordance with an embodiment of the disclosure. Referring to FIGS. 12-14, connection of the battery 606 will be discussed in further detail. Referring to FIG. 12, the battery 606 may include a lower portion 900 and an upper portion 902. The lower portion 900 includes the first end 820 of the enclosure 810. The upper portion 902 includes the second end 822 of the enclosure 810 and/or the shroud 832 defined by the outer wall 812. As shown in FIG. 12, the lower portion 900 of the battery 606 may be tuckable within the downtube 624 of the frame 602. For instance, the battery 606 may be carried by the handle 814 to the downtube 624 of the frame 602, at which point the first end 820 of the enclosure 810 is inserted or slid into the recess 800 and into the downtube 624 below the recess 800 and towards the bottom bracket 622. The first end 820 of the enclosure 810 may be inserted into the downtube 624 below the recess 800 until the step 830 of the battery 606 engages the downtube 624.

Referring to FIG. 13, once the first end 820 of the enclosure 810 is inserted into the recess 800 and into the downtube 624 of the frame 602, the upper portion 902 of the battery 606 may be moved (e.g., rotated) towards the headtube 620 of the frame 602. The upper portion 902 of the battery 606 may be engageable with the battery lock 850 to lock the battery 606 in place. For instance, the upper portion 902 of the battery 606 may be rotated towards the headtube 620 until the handle 814/striker 824 of the battery 606 is positioned for engagement with the battery lock 850 and the electrical connector 834 of the battery 606 is positioned for engagement with the power connector 860 within the recess 800. The upper portion 902 of the battery 606 may then be seated within the recess 800 to engage the handle 814/striker 824 with the battery lock 850 (e.g., with the latch 852) and to engage the electrical connector 834 with the power connector 860. Once the handle 814 (or striker 824) is engaged with the battery lock 850, the battery 606 may be locked to the micromobility transit vehicle 600 (see FIG. 14).

Referring to FIGS. 13 and 14, the outer wall 812 of the battery 606 may conceal the battery lock 850 when the battery 606 is locked in place. For example, the shroud 832 may conceal the attachment of the battery 606 to the battery lock 850, such as concealing the attachment of the handle 814 or striker 824 to the battery lock 850. As a result, the attachment between the battery 606 and the battery lock 850 may be protected from vandalism and damage, thereby reducing theft of the battery 606. In addition, the battery 606 may appear integrated with the frame 602 of the micromobility transit vehicle 600, making the battery 606 itself less noticeable.

FIG. 14 illustrates the battery 606 fully inserted within the downtube 624 of the frame 602. As shown in FIG. 14, the battery 606 may be receivable within the downtube 624 and the recess 800 to establish a continuous surface comprising one or more outer surfaces of the downtube 624 and one or more outer surfaces of the battery 606, such as to fit the battery 606 seamlessly or generally seamlessly within the recess 800. For instance, the outer wall 812 of the battery 606 may be shaped to establish the continuous surface when the battery 606 is received within the downtube 624 and the recess 800. Specifically, the outer wall 812 may have a shape complementary to the downtube 624 to establish the continuous surface. As described herein, "continuous surface" may refer to adjacent surfaces that are flush or substantially flush with one another, inclusive of any breaks, spaces, or interfaces between the adjacent surfaces. "Continuous surface" may also refer to adjacent surfaces that are aligned, conformed with one another, matched to one another, fitted to one another, integrated with one another, or the like.

Once the battery 606 is inserted into the downtube 624, the battery 606 may fill or generally fill the opening of the recess 800 such that the battery 606 is continuous or generally continuous with the profile of the downtube 624, with the attachment of the battery 606 to the downtube 624 concealed or hidden. As a result, the battery 606 (and battery connection) may be generally inconspicuous or unnoticeable, thereby discouraging theft, vandalism, or other damage to the battery 606. Such configurations may also streamline and/or reduce the form factor of the design of the micromobility transit vehicle 600. For example, positioning the battery 606 within the downtube 624 of the frame 602 may reduce the number of external accessories attached to the frame 602.

To remove the battery 606 from the downtube 624, the battery lock 850 is first unlocked, such as remotely via the management system 240 or via a mobile user device (e.g., user device 130) of a rider or service technician or manually via a button or override control. Once the battery lock 850 is unlocked, the upper portion 902 of the battery 606 may be rotated away from the downtube 624, such as via grasping the outer wall 812 (e.g., the shroud 832) and pulling the outer wall 812 away from the downtube 624. In some embodiments, the upper portion 902 of the battery 606 may be popped up or away from the downtube 624, such as automatically once the battery lock 850 is unlocked. For example, the battery 606 may be popped up or away from the downtube 624 by one or more springs, such as a leaf spring or a coil spring positioned between the battery 606 and the downtube 624. The handle 814 may then be grasped, and the battery 606 may be lifted out of the downtube 624 and the recess 800.

Figure 15:
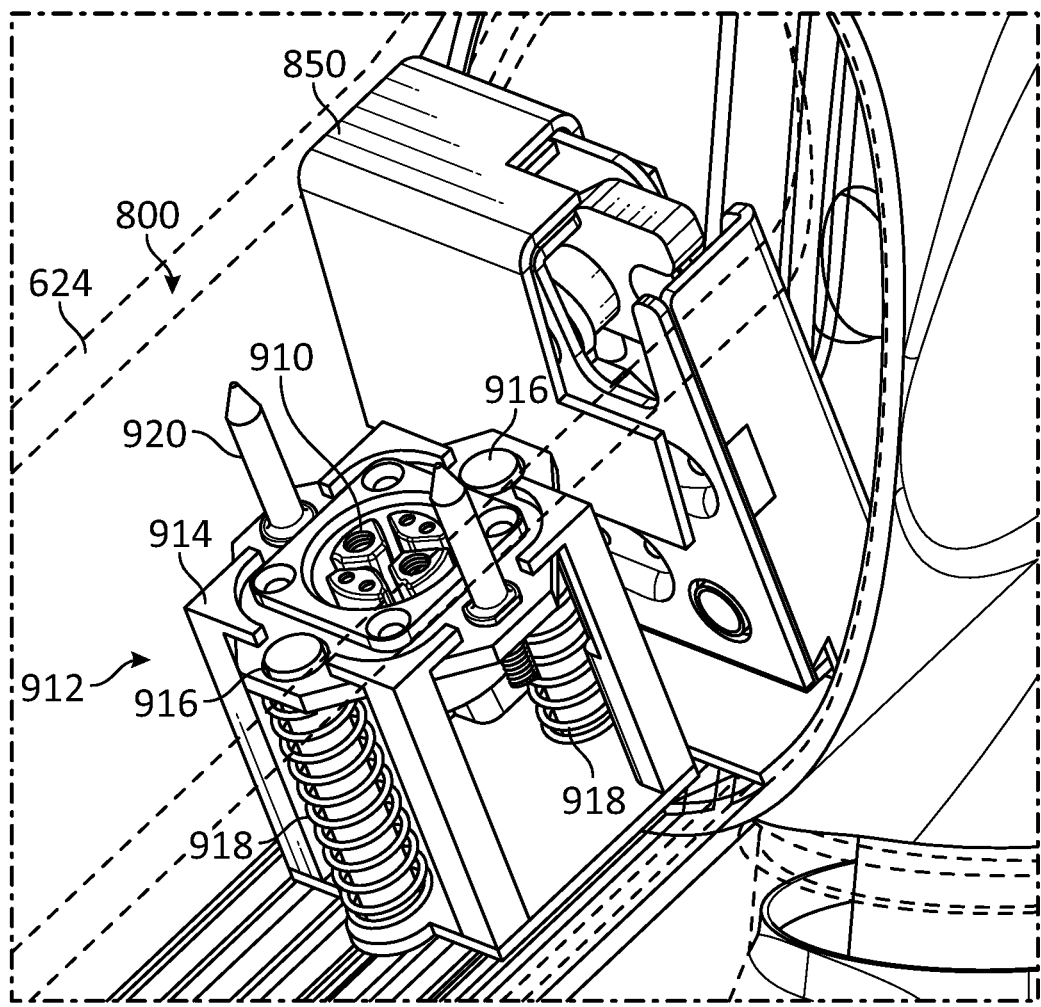
FIG. 15 illustrates a diagram of a power connector within the recess of the downtube in accordance with an embodiment of the disclosure.

FIG. 15 illustrates a diagram of a power connector 910 within the recess 800 of the downtube 624 in accordance with an embodiment of the disclosure. Except as otherwise noted below, the power connector 910 may be similar to the power connector 860 described above. For example, the power connector 910 may be positioned within the recess 800 disposed in the downtube 624 for engagement with the battery 606 when the battery 606 is positioned within the downtube 624 and the recess 800. As shown, the power connector 910 may be mounted on a spring assembly 912 such that the power connector 910 moves with the battery 606 (e.g., during battery insertion, during battery removal, during ride conditions, etc.).

The spring assembly 912 may include many configurations allowing the power connector 910 to move with the battery 606. As one example, the spring assembly 912 may include a plurality of posts 914 surrounding the power connector 910 and in sliding engagement of the power connector 910 to constrain movement of the power connector 910. For instance, the posts 914 may define a cage structure allowing the power connector 910 to slide up and down within the cage structure and along the posts 914. The spring assembly 912 may include one or more bosses 916 each with a flared terminal end. The power connector 910 may slidably engage the one or more bosses 916 such that the power connector 910 slides along the bosses 916 with movement of the battery 606. In some embodiments, the spring assembly 912 may bias the power connector 910 towards the flared terminal ends of the bosses 916. For instance, the spring assembly 912 may include one or more springs 918 biasing the power connector 910 towards the flared terminal ends of the bosses 916. In some embodiments, the springs 918 may be seated on the bosses 916. The springs 918 may maintain connection between the power connector 910 and the battery 606. In some embodiments, the springs 918 may function to pop the battery 606 up when the battery lock 850 is unlocked.

The power connector 910 may include other features for convenience. For example, the power connector 910 may include one or more alignment pins 920. The alignment pins 920 may be configured to mate with a portion of the battery 606 to align the power connector 910 with the battery 606, such as to align the power connector 910 with the electrical connector 834 of the battery 606. Such configurations may facilitate the battery 606 to be blind-mated to the power connector 910 as the battery 606 is inserted into the downtube 624.

Figure 16:
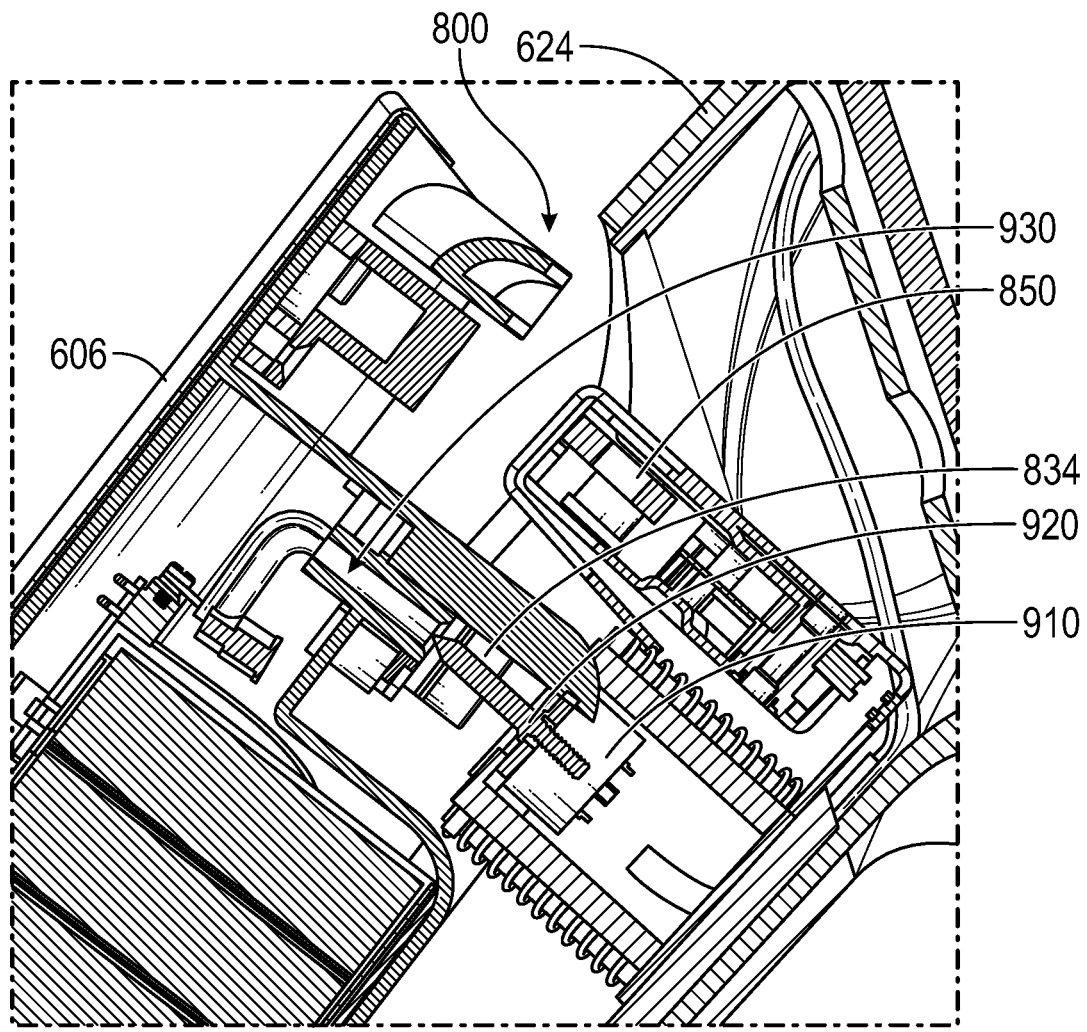
FIG. 16 illustrates a diagram of a connection between the battery and the power connector in accordance with an embodiment of the disclosure.

FIG. 16 illustrates a diagram of a connection between the battery 606 and the power connector 910 in accordance with an embodiment of the disclosure. Referring to FIG. 16, the battery 606 may include one or more apertures 930 configured to receive the one or more alignment pins 920 of the power connector 910 to align the power connector 910 with the electrical connector 834 of the battery 606. During insertion of the battery 606, the alignment pins 920 may first mate with the apertures 930 before electrical connection is made to align the power connector 910 with the electrical connector 834. Once aligned via receipt of the alignment pins 920 within the apertures 930, the power connector 910 may make electrical connection with the electrical connector 834 during further insertion of the battery 606.

Figure 17A:
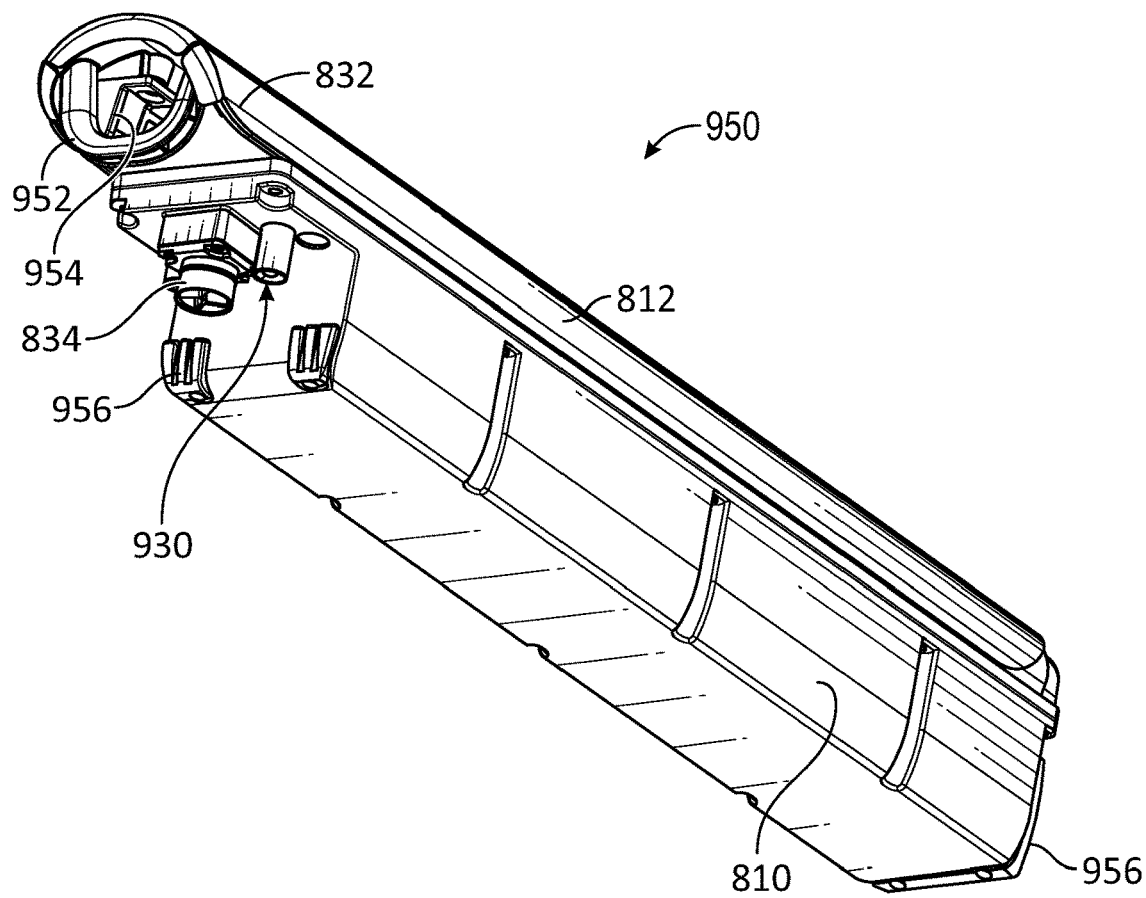
FIG. 17A illustrates a diagram of another battery for a micromobility transit vehicle in accordance with an embodiment of the disclosure.
Figure 17B:
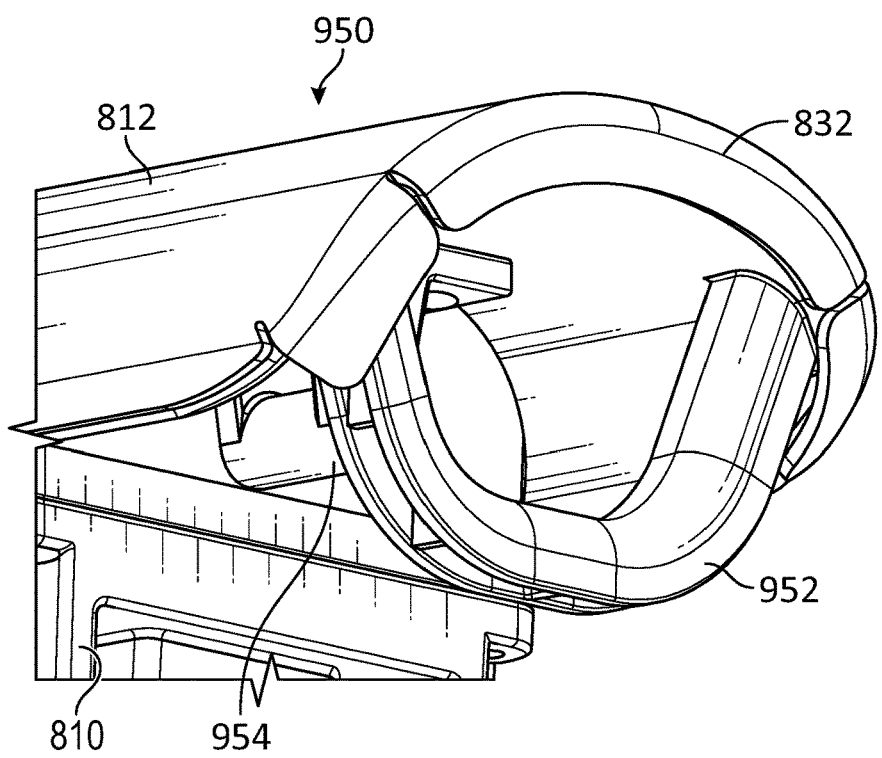
FIG. 17B illustrates an enlarged, fragmentary view of the battery of FIG. 17A in accordance with an embodiment of the disclosure.

FIG. 17A illustrates a diagram of another battery 950 in accordance with an embodiment of the disclosure. FIG. 17B illustrates an enlarged, fragmentary view of the battery 950 of FIG. 17A in accordance with an embodiment of the disclosure. Referring to FIGS. 17A and 17B, except as otherwise noted below, the battery 950 may be similar to the battery 606 described above. For instance, battery 950 may include enclosure 810 and outer wall 812 connected to the enclosure 810. The battery 950 may also include a handle 952 that extends from the outer wall 812, such as from the shroud 832. As shown, handle 952 may loop from the outer wall 812 (e.g., from the shroud 832), such as being formed as part of the outer wall 812. The battery 950 may also include a striker 954 for engagement with the battery lock 850. The striker 954 may extend from the outer wall 812. The striker 954 may be decoupled from the handle 952. The striker 954 may be positioned adjacent to the handle 952. In some embodiments, the battery 950 may include one or more bumpers 956. The bumpers 956 may be connected to the enclosure 810. The bumpers 956 may provide the battery 950 with drop protection and/or fit the battery 950 to the downtube 624 and/or recess 800.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micromobility transit vehicle, comprising:
 a frame comprising a downtube having a recess disposed therein;
 a battery lock within the recess; and
 a battery configured to be received within the recess of the downtube such that a continuous surface is formed by one or more outer surfaces of the downtube and one or more outer surfaces of the battery, the battery comprising
 a striker configured to be engaged with the battery lock to lock the battery in place, and
 a shroud configured to conceal engagement between the striker and the battery lock when the striker is engaged with the battery lock.

2. The micromobility transit vehicle of claim 1, wherein the battery further comprises:
 an enclosure configured to be received at least partially within the recess of the downtube;
 an outer wall connected to the enclosure, the outer wall shaped to form the continuous surface; and
 a handle extending from the outer wall.

3. The micromobility transit vehicle of claim 2, wherein: the striker is configured to extend from the outer wall.

4. The micromobility transit vehicle of claim 2, wherein: the handle extends between the enclosure and the outer wall; and
 the battery lock is configured to engage the handle of the battery to lock the battery in place.

5. The micromobility transit vehicle of claim 2, wherein: the enclosure comprises a first end and an opposing second end, the first end shaped to sink into the downtube of the frame, and the second end shaped to fit within the recess to form the continuous surface; and the shroud defines at least a portion of the outer wall of the battery.

6. The micromobility transit vehicle of claim 1, further comprising:
a power connector within the recess of the frame, the power connector configured to be engaged with the battery when the battery is received within the recess of the downtube to establish an electrical connection between the power connector and the battery.

7. A method of inserting the battery into the frame of the micromobility transit vehicle of claim 1, the method comprising:
carrying the battery by a handle of the battery to the downtube of the frame;
inserting a bottom portion of the battery into the downtube of the frame;
seating an upper portion of the battery into the recess to form the continuous surface; and
locking the striker to the battery lock within the recess.

8. A method of removing the battery from the frame of the micromobility transit vehicle of claim 1, the method comprising:
unlocking the battery lock, wherein unlocking the battery lock causes an upper portion of the battery to move away from the downtube of the frame;
removing the upper portion of the battery from the recess; and
lifting the battery out of the downtube via a handle.

9. A micromobility transit vehicle, comprising:
a frame comprising a downtube having a recess disposed therein; and
a battery lock within the recess and configured to engage a striker of a battery to lock the battery within the recess of the downtube, wherein engagement between the battery lock and the striker is concealed when the battery lock is engaged with the striker.

10. The micromobility transit vehicle of claim 9, further comprising a power connector within the recess and adjacent to the battery lock, the power connector configured to be engaged with the battery to establish an electrical connection between the power connector and the battery.

11. The micromobility transit vehicle of claim 9, wherein the downtube has a profile shape within the recess defined by alternating ribs and grooves.

12. The micromobility transit vehicle of claim 11, further comprising one or more cables routed within the grooves.

13. The micromobility transit vehicle of claim 9, further comprising the battery, the battery configured to be received within the recess of the downtube and comprising a lower portion tuckable within the downtube and an upper portion engageable with the battery lock to lock the battery in place.

14. The micromobility transit vehicle of claim 13, wherein:
the upper portion of the battery comprises a shroud configured to conceal the engagement between the battery lock and the striker when the battery lock is engaged with the striker;
the shroud defines at least a portion of an outer wall of the battery; and
at least a portion of a continuous surface is formed by one or more outer surfaces of the downtube and one or more outer surfaces of the battery.

15. A battery for a micromobility transit vehicle comprising a downtube having a recess disposed therein and a battery lock within the recess, the battery comprising:
an enclosure configured to be received at least partially within the recess of the downtube;
an outer wall connected to the enclosure, the outer wall having a shape complementary to the downtube such that at least a portion of a continuous surface is formed by one or more outer surfaces of the downtube and one or more outer surfaces of the battery;
a striker extending from the outer wall, the striker configured to engage the battery lock of the micromobility transit vehicle to lock the battery in place; and
a shroud defining at least a portion of the outer wall, the shroud configured to conceal engagement between the battery lock and the striker when the battery lock is engaged with the striker.

16. The battery of claim 15, further comprising a handle extending from the outer wall.

17. The battery of claim 16, wherein:
the handle is separate from the striker; or
the striker and the handle are formed together as a single element.

18. A method of inserting the battery of claim 15 into a micromobility transit vehicle comprising a do wntube having a recess disposed therein and a battery lock within the recess, the method comprising:
carrying the battery by a handle of the battery to the downtube of the micromobility transit vehicle;
inserting a bottom portion of the battery into the downtube of the micromobility transit vehicle;
seating an upper portion of the battery into the recess to form the continuous surface; and
locking the striker of the battery to the battery lock within the recess.

19. A method of removing the battery of claim 15 from a micromobility transit vehicle comprising a downtube having a recess disposed therein and a battery lock within the recess, the method comprising:
unlocking the striker from the battery lock, wherein unlocking the striker from the battery lock causes an upper portion of the battery to move away from the downtube;
removing the upper portion of the battery from the recess; and
lifting the battery out of the downtube via a handle.

20. The micromobility transit vehicle of claim 1, wherein the battery further comprises:
a step configured to engage with the downtube when the battery is received within the recess of the downtube.

* * * * *